United States Patent
Itoh et al.

(10) Patent No.: US 9,718,145 B2
(45) Date of Patent: Aug. 1, 2017

(54) METHOD OF PRODUCING ALUMINUM CLAD MEMBER

(71) Applicant: UACJ CORPORATION, Tokyo (JP)

(72) Inventors: Yasunaga Itoh, Nagoya (JP); Yusuke Ohashi, Nagoya (JP); Shoichi Sakoda, Nagoya (JP)

(73) Assignee: UACJ Corporation, Tokyo (JP)

( * ) Notice: Subject to any disclaimer, the term of this patent is extended or adjusted under 35 U.S.C. 154(b) by 0 days.

(21) Appl. No.: 15/148,373

(22) Filed: May 6, 2016

(65) Prior Publication Data

US 2016/0288248 A1     Oct. 6, 2016

Related U.S. Application Data

(63) Continuation of application No. PCT/JP2015/057086, filed on Mar. 11, 2015.

(30) Foreign Application Priority Data

Mar. 31, 2014   (JP) .................................. 2014-071289
May 15, 2014   (JP) .................................. 2014-101132

(51) Int. Cl.
| | |
|---|---|
| *B23K 31/00* | (2006.01) |
| *B23K 31/02* | (2006.01) |
| *B23K 20/16* | (2006.01) |
| *C22C 21/00* | (2006.01) |
| *C22F 1/04* | (2006.01) |

(Continued)

(52) U.S. Cl.
CPC ................ *B23K 20/16* (2013.01); *B21B 1/22* (2013.01); *B23K 20/04* (2013.01); *B32B 9/025* (2013.01);

(Continued)

(58) Field of Classification Search
CPC .. B23K 20/04; B23K 35/001; B23K 2203/10; B32B 15/01

(Continued)

(56) References Cited

U.S. PATENT DOCUMENTS 2,694,852 A * 11/1954 Rogers ................. B23K 1/0008
                                                          228/189
3,406,446 A * 10/1968 Muldovan .......... B23K 20/2275
                                                          228/190

(Continued)

FOREIGN PATENT DOCUMENTS

| JP | 06-344497 A1 | 12/1994 |
|---|---|---|
| JP | 08-257768 A1 | 10/1996 |

(Continued)

OTHER PUBLICATIONS

International Search Report and Written Opinion (Application No. PCT/JP2015/057086) dated Jun. 16, 2015.

*Primary Examiner* — Erin Saad
(74) *Attorney, Agent, or Firm* — Burr & Brown, PLLC

(57) ABSTRACT

An aluminum clad member is produced by: disposing a joining assistance member at a joint interface between an Al core member and an Al skin member, which joining assistance member being formed by crossing Al wires with each other in longitudinal and lateral directions to form a grid, and having a structure in which spot-like thick portions having a thickness of 0.2-3.2 mm are formed at intersections of the Al wires and arranged in the longitudinal and lateral directions so as to be spaced apart from each other by a distance of 0.2-13 mm; and performing a hot rolling operation with respect to the thus obtained stack of the Al core member, the Al skin member and the joining assistance member, by partially fixing together those members at their peripheral portions or without fixing together those members, such that the joint interfaces is communicated with an ambient air.

10 Claims, 3 Drawing Sheets

(51) Int. Cl.
*C22C 21/06* (2006.01)
*B32B 9/02* (2006.01)
*B32B 9/04* (2006.01)
*B32B 15/20* (2006.01)
*B21B 1/22* (2006.01)
*B23K 20/04* (2006.01)
*B32B 15/01* (2006.01)

(52) U.S. Cl.
CPC ............ *B32B 9/041* (2013.01); *B32B 15/016* (2013.01); *B32B 15/20* (2013.01); *C22C 21/00* (2013.01); *C22C 21/06* (2013.01); *C22F 1/04* (2013.01); *B21B 2001/225* (2013.01)

(58) Field of Classification Search
USPC ...................................... 228/190, 189; 245/8
See application file for complete search history.

(56) References Cited

U.S. PATENT DOCUMENTS

| | | | |
|---|---|---|---|
| 3,764,277 A | * | 10/1973 | Hollis ...................... B64C 1/06 |
| | | | 220/646 |
| 5,493,153 A | | 2/1996 | Arikawa et al. |
| 6,074,764 A | * | 6/2000 | Takayasu ............. B23K 35/004 |
| | | | 428/594 |
| 2004/0142202 A1 | | 7/2004 | Kinoshita et al. |

FOREIGN PATENT DOCUMENTS

| | | |
|---|---|---|
| JP | 2002-167637 A1 | 6/2002 |
| JP | 2004-241765 A1 | 8/2004 |
| JP | 2008-264825 A1 | 11/2008 |
| JP | 2013-220435 A1 | 10/2013 |
| WO | 2013/129279 A1 | 9/2013 |

* cited by examiner

METHOD OF PRODUCING ALUMINUM CLAD MEMBER

CROSS REFERENCE TO RELATED APPLICATION

This application is a continuation of the International Application No. PCT/JP2015/057086 filed on Mar. 11, 2015, which claims the benefit under 35 U.S.C. §119(a)-(d) of Japanese Application No. 2014-071289 filed on Mar. 31, 2014, and Japanese Application No. 2014-101132 filed on May 15, 2014, the entireties of which are incorporated herein by reference.

BACKGROUND OF THE INVENTION

Field of the Invention

The present invention relates to a method of producing an aluminum clad member, and more particularly relates to a method which permits advantageous production of an aluminum clad member by superposing an Al skin member formed of aluminum or an aluminum alloy on at least one of opposite major surfaces of an Al core member formed of aluminum or an aluminum alloy, and subjecting the thus obtained stack of the Al core member and the Al skin member to a hot rolling process, so that those members are joined together and integrated into a one-piece body.

Description of Related Art

The aluminum clad member is a sheet or plate member obtained by: superposing the Al skin member on at least one of the opposite major surfaces of the Al core member, and interposing an Al intermediate member formed of aluminum or an aluminum alloy between the Al core member and the Al skin member, as needed depending on an application of the aluminum clad member to be obtained, thereby forming the stack (laminar body) having a multi-layer structure; heating the stack to a predetermined temperature and subjecting the stack to the hot rolling process; and then subjecting the stack to a cold rolling process to reduce the thickness of the stack to a predetermined value. Various methods have been proposed as methods of producing such aluminum clad member (see JP-A-2002-167637, JP-A-2008-264825 and JP-A-2013-220435, for example), and the aluminum clad member has been practically used as a brazing sheet for a heat exchanger for transporting equipment such as an airplane and an automotive vehicle. However, there remain many problems to be solved regarding the conventional methods of producing the aluminum clad member.

Specifically, in the hot clad rolling process described above, the members constituting the stack are heated to a high temperature and subjected to a high pressure, whereby those members are joined together at their interface. This joining is generally called "pressure welding". In this respect, it is noted that surfaces of the members constituting the stack such as the Al core member and the Al skin member are covered by oxide films. Accordingly, in order to join those members together, it is necessary to destruct the oxide films. However, the oxide films cannot be destructed by merely applying the high pressure to those members in a direction perpendicular to their joint surfaces, in the hot clad rolling process, resulting in difficulty in joining those members together. Therefore, it is a general knowledge among those skilled in the art that it is necessary to destruct the oxide films by forcing the members of the stack to slide at their interface.

In fact, where a clad ratio of the skin member is excessively high, it is difficult to cause sliding of the core member and the skin member at their interface, resulting in the difficulty in joining them together. On the other hand, where the clad ratio of the skin member is excessively low, a temperature of the skin member decreases before the hot clad rolling process, so that it is difficult to destruct the oxide films. Further, the excessively low clad ratio of the skin member gives rise to a problem that rolling defects tend to be caused by tearing of the skin member during the hot rolling process, for example. In view of the above-described problems regarding the production of the clad member, the clad ratio of the aluminum clad member is generally limited to a value within a range of 5-25%. Further, it is considered difficult to produce the aluminum clad member by using 5000 series, 6000 series and 7000 series Al alloys according to JIS, as materials of the core member and the skin member, since those Al alloys contain a large amount of magnesium (Mg), and have stiff oxide films on their surfaces in the presence of a Mg oxide (MgO) as well as an aluminum oxide ($Al_2O_3$) formed on their surfaces.

By the way, in order to destruct the oxide films, it is generally considered effective to cause the sliding of the Al core member and the Al skin member at their interface during the clad rolling process, as described above. However, the sliding of those members results in an adverse effect on a clad ratio distribution. Namely, the sliding of the Al core member and the Al skin member at their interface is caused by a difference between an amount of elongation of the Al core member and an amount of elongation of the Al skin member during the rolling process. In this respect, it is noted that in the rolling process performed to produce the clad member, a portion of the stack closer to rolls is easier to be elongated in a rolling direction. Accordingly, where the strength of the skin member is substantially equal to or lower than that of the core member, the amount of elongation of the skin member is considerably larger than that of the core member. On the other hand, where the strength of the core member is lower than that of the skin member, the amount of elongation of the core member is sometimes considerably larger than that of the skin member. In either of the above-described cases, the Al core member and the Al skin member are elongated by the same amount after those members are sufficiently joined together at their interface. However, in an early stage of the rolling process, joining of the core member and the skin member at their interface is insufficient, and the difference between the amounts of their elongation is affected by many factors such as the materials of the core member and the skin member, the clad ratio, a rolling temperature and a change in a rate of reduction (rolling reduction rate). Accordingly, it is difficult to precisely anticipate the difference between the amounts of elongation of the core member and the skin member before those members are sufficiently joined together at their interface, resulting in reduction of accuracy of the clad ratio.

On the other hand, the sliding of the core member and the skin member at their interface is remarkable in front and rear end portions of the stack as seen in the rolling direction, and in right and left end portions of the stack as seen in its width direction, in which end portions, resistance to the sliding is lower than that in the central portion of the stack. Accordingly, the clad ratios in the front and rear end portions of the stack as seen in the rolling direction and the right and left end portions of the stack as seen in its width direction differ from the clad ratio in the central portion of the stack. For instance, where the skin member is easier to be elongated than the core member, the clad ratio decreases in the front and rear end portions and the right and left end portions of the stack. Therefore, after the clad member is obtained by the hot rolling process, its front and rear end portions and right and left end portions having the clad ratio outside the tolerable range are generally cut off, resulting in considerable reduction of an yield of the clad member and a considerable increase of its cost.

The difference of the clad ratio among different portions of the aluminum clad member, in other words, a variation in the clad ratio distribution is presumably generated for reasons described below. In production of the aluminum clad member, the hot clad rolling process is generally performed at a rolling reduction rate as low as not higher than several %, in the early stage, for purposes of: 1) elongating the Al skin member (flattening the Al skin member where the skin member has a higher strength than the core member) so that the Al skin member is brought into even surface contact with the Al core member or the Al intermediate member; and 2) surface joining the Al core member and the Al skin member together. In this respect, it is noted that the surface joining of the Al core member and the Al skin member is not completed in this stage. Particularly in the case where the Al skin member is obtained by a hot rolling process and used without being subjected to any other process after the hot rolling process, and where the Al skin member has a low degree of flatness, first several passes of the hot clad rolling process for producing the clad member are performed for elongating or flattening the Al skin member, and the Al skin member and the Al core member are not joined together in those first several passes. Also, even in some cases where a machining operation is performed with respect to a surface of the Al skin member to be joined to the Al core member or the Al intermediate member, in order to improve the flatness of the above-described surface, only the Al skin member or the Al core member is substantially elongated in the first several passes of the hot clad rolling process. At this time, in the case where only the Al skin member is elongated, the clad ratio is initially reduced over the entire area of the clad member, and an amount of reduction of the clad ratio is more remarkable in the end portions of the clad member as described above, in which end portions, resistance to elongation of the Al skin member is relatively low.

In the subsequent stage wherein the joining of the Al core member and the Al skin member at their interface has progressed to some extent, the rolling reduction rate is slightly increased to elongate the Al core member and the Al skin member by a large amount with a strong rolling force, and to destruct the oxide films by generating a strong friction force at the joint interface between the Al core member and the Al skin member, so that those members are completely joined together. However, the joining of the Al core member and the Al skin member is not completed concurrently and uniformly over the entire area of the joint interface. In regions of the joint interface where the Al core member and the Al skin member are not sufficiently joined together, if the strength of the Al skin member is lower than that of the Al core member, reduction of the thickness of the Al skin member caused by its elongation preferentially proceeds as compared with reduction of the thickness of the Al core member, resulting in partial reduction of the clad ratio. This partial reduction of the clad ratio also takes place in a portion of the clad member other than its front and rear end portions and right and left end portions, resulting in unevenness and a variation of the clad ratio in the portion of the clad member, which portion will not be cut off and will be obtained as the end product.

As described above, the clad ratio of the clad member as a whole does not have a sufficiently high degree of accuracy, due to the difference in the strength of the Al core member and the Al skin member, for example, and the clad ratio considerably deviates from the target value in the front and rear end portions and the right and left end portions of the clad member, which end portions will be cut off. Further, the clad ratio is uneven and has the variation even in the portion of the clad member which will not be cut off and will be obtained as the end product.

SUMMARY OF THE INVENTION

The present invention was made in view of the background art described above. Therefore, it is an object of the invention to provide a method of producing an aluminum clad member, which method permits a significant improvement of the clad ratio distribution of the aluminum clad member to significantly improve the yield of the end product, and significant mitigation of limitations in terms of the materials of the members to be stacked and cladded on each other and in terms of the clad ratio.

The above-described object of the invention can be achieved according to a principle of the invention, which provides a method of producing an aluminum clad member by superposing at least one Al skin member formed of aluminum or an aluminum alloy on one or both of opposite major surfaces of an Al core member formed of aluminum or an aluminum alloy, to form a stack, and subjecting the stack to a hot rolling process, to join together the Al core member and the at least one Al skin member and integrate those members into a one-piece body, wherein the above-described stack comprises a joining assistance member disposed at a joint interface between the above-described Al core member and the above-described at least one Al skin member, the joining assistance member being formed by crossing Al wires of aluminum or an aluminum alloy with each other in longitudinal and lateral directions to form a grid, and having a structure in which spot-like thick portions having a thickness of 0.2-3.2 mm are formed at intersections of the Al wires and arranged in the longitudinal and lateral directions so as to be spaced apart from each other by a distance of 0.2-13 mm; and the above-described hot rolling process is performed with respect to the above-described stack in a state wherein the above-described Al core member, the above-described joining assistance member and the above-described at least one Al skin member are partially fixed together at their peripheral portions, or those members are not fixed together, such that the above-described joint interface is communicated with an ambient air.

The above-described object can also be achieved according to an advantageous form of the invention, wherein the above-described stack further comprises at least one Al sheet disposed on one or both of opposite sides of the above-described joining assistance member, the at least one Al sheet having a thickness of 5-200 μm and being formed of an aluminum material having a Mg content of 0-0.7% by mass, and the above-described hot rolling process is performed with respect to the above-described stack in which the above-described joining assistance member and the above-described at least one Al sheet are disposed at the joint interface between the above-described Al core member and the above-described at least one Al skin member.

In a preferable form of the method of producing the aluminum clad member according to the invention, the above-described Al wires have a diameter of 0.1-1.6 mm.

In another preferable form of the method of producing the aluminum clad member according to the invention, the above-described Al wires are formed of an Al—Mg-based alloy containing 1.5-6% by mass of magnesium.

In a further preferable form of the method of producing the aluminum clad member according to the invention, oxide films covering surfaces of the above-described Al wires are chemically destructed and removed by a treatment performed with respect to the Al wires by using an acid solution or an alkaline solution.

In other preferable form of the method of producing the aluminum clad member according to the invention, the above-described hot rolling process is performed by conducting a reverse rolling operation in which the above-described stack is passed between a pair of rolls a plurality of times, and a direction of rotation of the rolls in odd-number passes and a direction of rotation of the rolls in even-number passes are opposite to each other, so that the hot rolling process is performed alternately in opposite two directions.

In other preferable form of the method of producing the aluminum clad member according to the invention, the above-described stack is inserted between a pair of rolls without applying a load to the stack, and then a load is applied to the stack and the pair of rolls are rotated to perform the above-described hot rolling process by conducting a reverse rolling operation in which a direction of rotation of the rolls is reversed each time the stack is passed between the rolls.

In other preferable form of the method of producing the aluminum clad member according to the invention, the above-described stack further comprises an Al intermediate member in the form of a plate of aluminum or an aluminum alloy disposed between the above-described Al core member and the above-described at least one Al skin member, the above-described joining assistance member is disposed at at least one of an interface between the Al core member and the Al intermediate member and an interface between the Al intermediate member and the at least one Al skin member, and the Al core member, the Al intermediate member, the joining assistance member and the at least one Al skin member are partially fixed together at their peripheral portions, or not fixed together.

In other preferable form of the method of producing the aluminum clad member according to the invention, the above-described stack further comprises an Al intermediate member in the form of a plate of aluminum or an aluminum alloy disposed between the above-described Al core member and the above-described at least one Al skin member, and the above-described joining assistance member and at least one Al sheet having a thickness of 5-200 µm and formed of an aluminum material having a Mg content of 0-0.7% by mass are disposed at at least one of an interface between the Al core member and the Al intermediate member and an interface between the Al intermediate member and the at least one Al skin member, such that the at least one Al sheet is disposed on one or both of opposite sides of the joining assistance member.

In other preferable form of the method of producing the aluminum clad member according to the invention, the above-described at least one Al sheet is formed of pure aluminum or an aluminum material having an aluminum content not lower than 99.0% by mass.

In the method of producing the aluminum clad member according to the invention, the Al core member and the Al skin member (hereinafter the phrase "the Al core member and the Al skin member" should be interpreted to also mean a combination of the Al core member and the Al intermediate member and/or a combination of the Al intermediate member and the Al skin member, in the case where the Al intermediate member is interposed between the Al core member and the Al skin member) are initially gripped together by a number of the spot-like thick portions of the joining assistance member, which spot-like thick portions are distributed with a predetermined distance from each other, so that the Al core member and the Al skin member disposed on respective opposite sides of the joining assistance member do not slide with respect to each other during the rolling process, unlike Al core and skin members subjected to the hot rolling process performed in the conventional production of the aluminum clad member, whereby quality of the aluminum clad member obtained by the method of this invention is improved in several points.

Namely, the Al core member and the Al skin member do not slide with respect to each other, so that those members are elongated together, whereby the clad ratio distribution can be significantly improved. Further, joining of the Al core member and the Al skin member uniformly progresses from the spot-like thick portions distributed over the joint interface, so that a problem of peeling of the skin member due to generation of a large unjoined area, and a problem of partial blister of the skin member, which problems are frequently caused in the conventional hot rolling process, are hardly caused according to the method of this invention.

The invention has a further advantage that the method of this invention makes it possible to produce the aluminum clad member by employing aluminum materials and a clad ratio which are difficult to be employed in production of the aluminum clad member by the conventional hot clad rolling process. Namely, even where the members to be cladded on each other have a high Mg content, the oxide films covering surfaces of those members are destructed by an extremely strong rolling force applied to the spot-like thick portions, and the oxide films are further destructed by a shearing force generated at boundaries between the spot-like thick portions and portions of the members adjacent to the spot-like thick portions, resulting in enlargement of the joined areas from the spot-like thick portions. Therefore, the clad member can be easily produced from the members having the high Mg content, by the clad rolling process. Further, the joining process similar to the above-described process can be realized irrespective of whether the clad ratio is high or low. Accordingly, limitations in terms of the clad ratio can be substantially eliminated according to the present invention.

As described above, the method of producing the aluminum clad member according to the invention has a major characteristic that the method not only permits a significant improvement of a production yield of the aluminum clad member, and consequent significant reduction of a cost, but also permits production of the aluminum clad member having excellent quality by employing materials and the clad ratio which are difficult to be employed in the conventional production of the aluminum clad member.

Particularly in the case where the clad rolling process is performed in the state wherein the at least one Al sheet having the Mg content of 0-0.7% by mass and the predetermined thickness is disposed on one or both of the opposite sides of the joining assistance member having the spot-like thick portions formed at the intersections of a grid structure, such that the at least one Al sheet and the joining assistance member are disposed at the interface between the Al core member and the Al skin member, the oxide films formed on the surfaces of the Al core member and the Al skin member are effectively destructed owing to functions of the joining assistance member and the at least one Al sheet, whereby the Al core member and the Al skin member can be easily joined together at their interface, and joining of the Al core member and the Al skin member can be advantageously promoted.

Namely, the joining assistance member having the predetermined spot-like thick portions has the function of effectively destructing the oxide films covering the surfaces of the Al core member and the Al skin member, which are disposed on respective opposite sides of the joining assistance member, and the oxide films covering the surfaces of the Al sheet, while the Al sheet disposed on one or both of the opposite sides of the joining assistance member has the function of promoting joining of the Al core member and the Al skin member at their interface after the oxide films on their surfaces are destructed. Thus, in an early stage of the clad rolling process, a load is concentrated at points of contact between the spot-like thick portions of the joining assistance member and the Al skin and core members through the Al sheet, and an extremely strong rolling force is applied to the above-described points. Accordingly, even in the case where the skin member and the core member have a high Mg content, the oxide films covering their surfaces are effectively destructed at the above-described points, and destruction of the oxide films further progresses from the above-described points, by the shearing force generated at the boundaries between the above-described points and the portions of the skin member and the core member adjacent to the above-described points. At the same time, the spot-like thick portions of the joining assistance member are embedded into the Al sheet by the strong load applied to the spot-like thick portions, whereby the Al sheet is deformed by a large amount, and the oxide films covering the Al sheet are destructed along with its deformation. Further, the Al sheet is formed of the soft Al material having the Mg content of 0-0.7% by mass. Accordingly, surfaces of metals of the Al skin member, Al core member and Al sheet which are exposed by the above-described progress of destruction of the oxide films are instantly and strongly pressed and bonded to each other. In addition, the exposed surfaces of the metals of the joining assistance member and the Al sheet are also instantly and strongly pressed and bonded to each other.

On the other hand, in the case where only the Al sheet is disposed at the joint interface between the Al skin member and the Al core member, the Al sheet cannot exhibit a function of promoting destruction of the oxide films on the Al skin member and the Al core member, so that the surfaces of the metals of those members are not sufficiently exposed, giving rise to difficulty in uniformly joining together those members. However, in the case where the specific joining assistance member and the Al sheet are used in production of the aluminum clad member, it is possible to easily produce the aluminum clad member by the clad rolling process from the members (Al skin member and Al core member) formed of the materials having a high Mg content, owing to the above-described functions of the joining assistance member and the Al sheet, although such aluminum clad member is difficult to be produced by the conventional method. In addition, sliding of the Al core member and the Al skin member at their interface is restricted, since the joining assistance member is embedded into those members, so that the Al core member and the Al skin member are elongated together, whereby the clad ratio distribution is significantly improved.

BRIEF DESCRIPTION OF THE DRAWINGS

FIGS. 2A and 2B are schematic views showing an example of the joining assistance member used in the invention, in which FIG. 2A is an enlarged fragmentary plan view, and FIG. 2B is a cross sectional view taken along a line A-A in FIG. 2A;

DETAILED DESCRIPTION OF THE INVENTION

Figure 1:
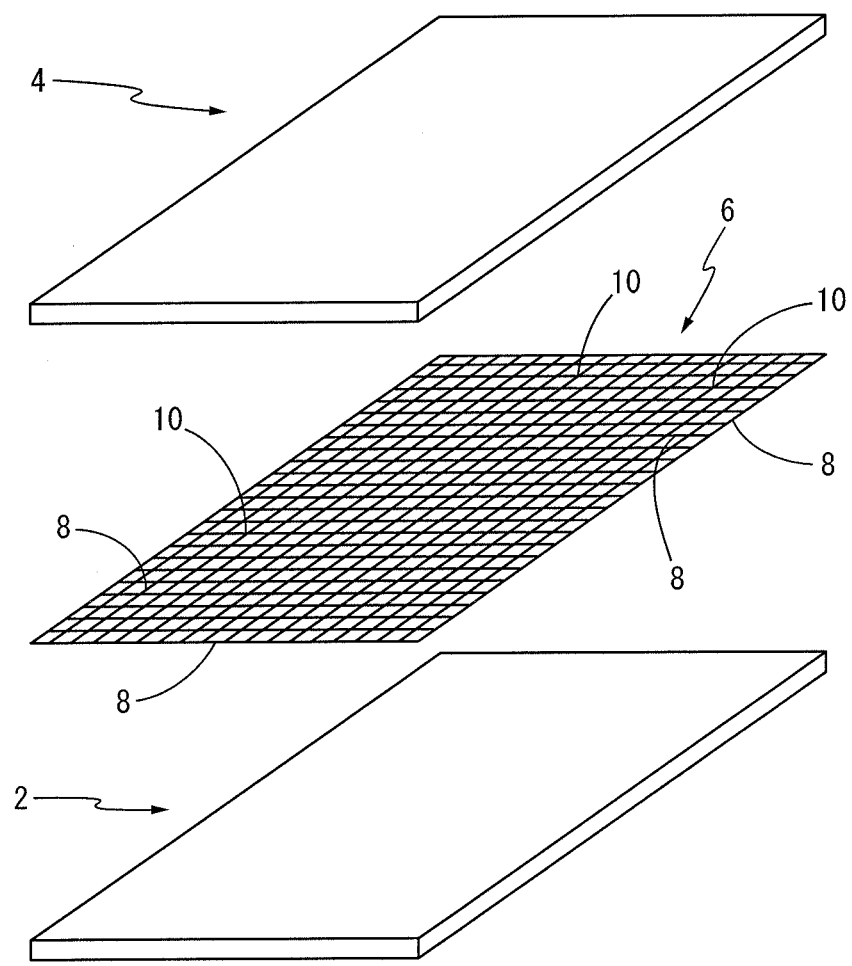
FIG. 1 is an exploded schematic perspective view showing a stack according to one embodiment of the invention, which stack consists of an Al skin member, a joining assistance member and an Al core member.

The present invention has a major characteristic that an Al core member 2 and an Al skin member 4 are joined together by a clad rolling process performed in a state wherein a joining assistance member 6 or auxiliary coupling member is disposed between the Al core member 2 and the Al skin member 4, as shown in FIG. 1, so that almost no substantial sliding of the Al core member 2 and the Al skin member 4 at their joint interface takes place. The joining assistance member 6 is formed from Al wires 8 of aluminum or an aluminum alloy which are crossed with each other in longitudinal and lateral directions to form a grid, such that spot-like thick portions 10 formed at intersections of the Al wires 8 are distributed in the longitudinal and lateral directions with a predetermined distance from each other. Namely, in an early stage of the hot rolling process performed to clad the Al core member 2 and the Al skin member 4 on each other, particularly in a stage wherein the Al core member 2 and the Al skin member 4 are forced to slide at their joint interface, an extremely strong rolling force is applied to the spot-like thick portions 10 distributed in the form of spots, owing to the presence of the joining assistance member 6. Accordingly, where the Al core member 2 and the Al skin member 4 are cladded on each other as described above, those members 2 and 4 are joined together through the spot-like thick portions 10 and fixed together in the form of spots, so that almost no sliding of those members 2 and 4 at their joint interface takes place.

On the other hand, where a member such as a punched aluminum sheet (sheet member having circular or rectangular holes formed therethrough in the form of a network) which does not have the spot-like thick portions is disposed between the Al core member and the Al skin member to be joined together, the rolling force is evenly received by the above-described member (punched aluminum sheet) over its entire surface area, so that the Al core member and the Al skin member cannot be surely joined together through the above-described member, and the Al skin member or the Al core member is often elongated as in the case where the above-described member is not disposed between those members.

In the subsequent stage of the clad rolling process wherein the Al core member 2 and the Al skin member 4 have been fixed together in the form of spots through the spot-like thick portions 10 as described above, the Al core member 2 and the Al skin member 4 are joined together through portions of the Al wires 8 connecting the adjacent spot-like thick portions 10 with each other, whereby the Al core member 2 and the Al skin member 4 are fixed together in the form of cells. In this stage wherein the Al core member 2 and the Al skin member 4 are fixed together in the form of spots and cells through the joining assistance member 6, the Al core member 2 and the Al skin member 4 slightly deform within the cells. At this time, in portions of those members 2 and 4 held in contact with the above-described portions of the Al wires 8 connecting the adjacent spot-like thick portions 10 with each other, oxide films covering surfaces of the joining assistance member 6, the Al core member 2 and the Al skin member 4 are destructed by a strong friction force, whereby the Al core member 2 and the Al skin member 4 are joined to the joining assistance member 6. The destruction of the oxide films progresses from thus formed joints between the joining assistance member 6 and the Al core member 2 and the Al skin member 4, and promotes the joining of the Al core member 2 and the Al skin member 4 which slightly deform within the cells and which are brought into contact with each other within the cells along with a progress of the rolling process.

While the joining of the Al core member 2 and the Al skin member 4 is in progress as described above, it is necessary that the spot-like thick portions 10 are fixed in position in both of the longitudinal and lateral directions. If the spot-like thick portions 10 are isolated from each other, and a change in positions of the spot-like thick portions 10 is not restricted or the positions of the spot-like thick portions 10 are not fixed, even where the isolated spot-like thick portions 10 are temporarily joined to the Al core member 2 and the Al skin member 4 by the strong rolling force, the joints formed between the spot-like thick portions 10 and the Al core member 2 or the Al skin member 4 are easily fractured by a shearing force generated by elongation of the Al core member 2 or the Al skin member 4 in a subsequent pass of the rolling process. As a result, the Al core member 2 and the Al skin member 4 slide at their joint interface, as in the case where the spot-like thick portions 10 are not present, so that operational and physical advantages of the present invention cannot be sufficiently achieved. In this respect, it is noted that the spot-like thick portions 10 are generally fixed in position in the longitudinal and lateral directions, by arranging the Al wires 8 so as to extend in the rolling direction and a direction perpendicular to the rolling direction. However, substantially the same operational and physical advantages can be achieved even where the Al wires 8 are arranged so as to extend in two directions having an angle of 45° with respect to the respective longitudinal and lateral directions, for example.

Figure 2A:
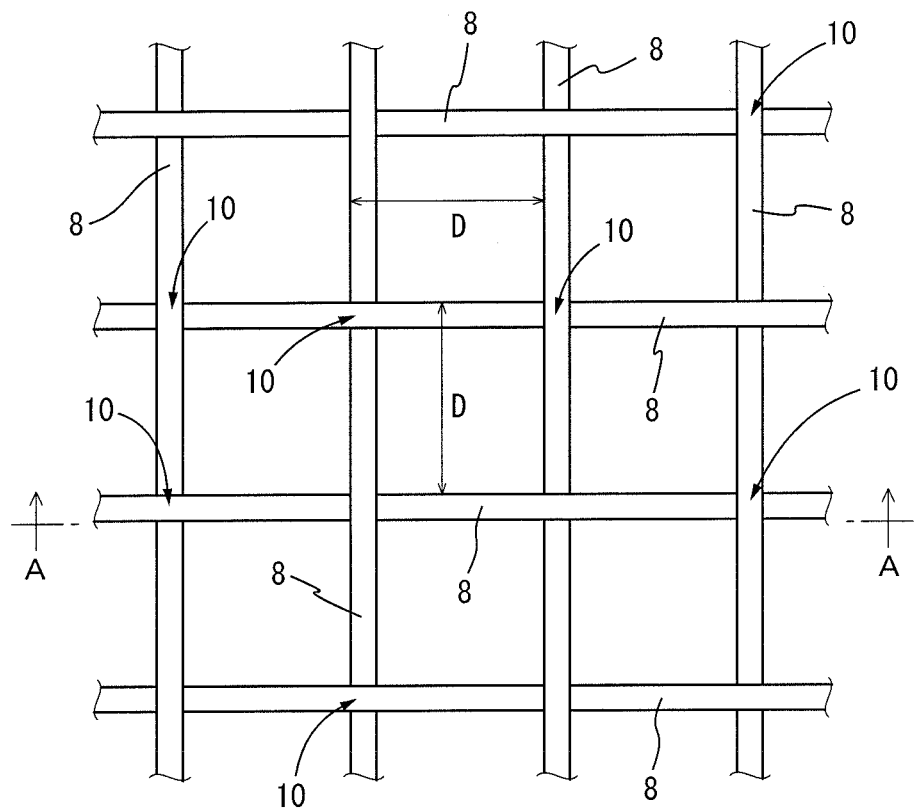
Figure 2B:
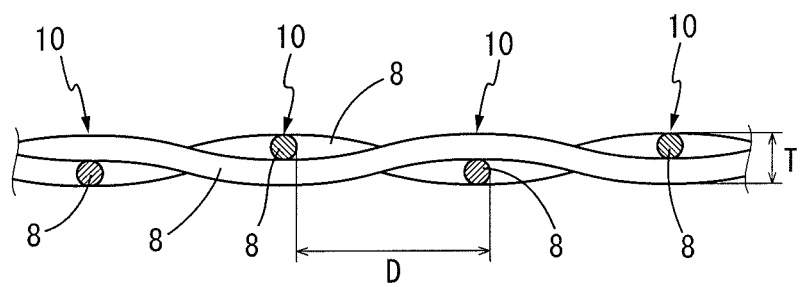

By the way, a thickness T of the spot-like thick portions 10 of the joining assistance member 6 shown in FIG. 2B is adequately selected particularly depending on a thickness of the Al skin member 4 at the time of its superposition on the Al core member 2. However, irrespective of the thickness of the Al skin member 4, the thickness of the spot-like thick portions 10 smaller than 0.2 mm results in reduction of a strength of the joints at the spot-like thick portions 10, giving rise to difficulty in achieving desired effects, whereas the thickness of the spot-like thick portions 10 larger than 3.2 mm results in an adverse effect on surface smoothness of the clad member to be obtained. Therefore, in the present invention, the thickness T of the spot-like thick portions 10 of the joining assistance member 6 is selected within a range of 0.2-3.2 mm.

A distance D between the adjacent spot-like thick portions 10 of the joining assistance member 6 shown in FIG. 2A is adequately selected particularly depending on the thickness of the Al skin member 4 at the time of its superposition on the Al core member 2. However, irrespective of the thickness of the Al skin member 4, the distance D smaller than 0.2 mm is not preferred since it results in reduction of the rolling force applied to the spot-like thick portions 10, and consequent reduction of a joining force at the spot-like thick portions 10. On the other hand, the distance D larger than 13 mm is not preferred since it results in an increase of the shearing force applied to the joints formed between the spot-like thick portions 10 and the Al core member 2 or the Al skin member 4, in the rolling direction, and a consequent increase of a risk of fracture, leading to insufficiency of an effect of the spot-like thick portions 10 to prevent the sliding of the members superposed on each other. Therefore, in the present invention, the distance D between the adjacent spot-like thick portions 10 is held within a range of 0.2-13 mm.

In the present invention, the joining assistance member 6 having the above-described spot-like thick portions 10 is formed by arranging the Al wires 8 of aluminum or an aluminum alloy so as to be crossed with each other in the longitudinal and lateral directions to form of the grid as shown in FIG. 2A, whereby the above-described spot-like thick portions 10 are formed at the intersections of the Al wires 8 extending in the longitudinal and lateral directions, such that the adjacent spot-like thick portions 10 are spaced apart from each other in both of the longitudinal and lateral directions by the predetermined distance D. Where the Al wires 8 have a diameter smaller than 0.1 mm, the spot-like thick portions 10 have the thickness smaller than 0.2 mm, resulting in the reduction of the strength of the joints at the spot-like thick portions 10, and the difficulty in achieving the desired operational and physical advantages, as described above. On the other hand, where the Al wires 8 have a diameter larger than 1.6 mm, the spot-like thick portions 10 have the thickness larger than 3.2 mm, resulting in the adverse effect on the surface smoothness of the clad member to be obtained, as described above. Therefore, the diameter of the Al wires 8 is selected within a range of 0.1-1.6 mm. The joining assistance member 6 formed from the Al wires 8 arranged in the longitudinal and lateral directions is configured such that a number of the spot-like thick portions 10 are distributed in the longitudinal and lateral directions with the predetermined distance from each other, and such that the change in the positions of the spot-like thick portions 10 is restricted, or the spot-like thick portions 10 are fixed in position. Specific examples of the configuration of the joining assistance member 6 include: a configuration in which the Al wires 8 extending in the longitudinal and lateral directions are interlaced with each other, such that the Al wires 8 extending in the longitudinal direction alternately pass over and under the successive Al wires 8 extending in the lateral direction, whereby the shape of the thus obtained joining assistance member 6 is fixed; and a configuration in which the Al wires 8 arranged in the longitudinal and lateral directions are bonded together at their intersections by pressure bonding or the like. In practice, a wire cloth (netting) such as a plain-weave wire cloth and a twill-weave wire cloth formed of aluminum or an aluminum alloy is used as the joining assistance member 6.

By the way, in order to perform the clad rolling process with respect to members formed of materials having low degrees of bondability, there is known a technique of reducing a pressure at a joint interface in order to improve the bondability of the members [see, for example, *Quarterly Journal of the Japan Welding Society Vol.* 9 (1991) *No.* 1: Mukai, Nishio, Kato, Inoue, Hatakenaka]. It is considered that the above-described technique permits an improvement of the bondability of the members to be cladded on each other, even in production of the clad member from the members formed of aluminum materials, depending on constitution of the materials superposed on each other. However, a method proposed to reduce the pressure at the joint interface as described above requires reduction of the pressure in the entire rolling line, resulting in an excessively high cost of equipment and a consequent increase of the cost of the clad member to be obtained, so that it is difficult to industrially employ the above-described method. In order to reduce the cost of the above-described method of reducing the pressure at the joint interface, it is considered also possible to employ a technique of welding the whole periphery of the joint interface, in other words, welding the whole peripheral portion of a stack of the members to be cladded on each other, except an exhaust vent provided through a part of the periphery, and then reducing the pressure at the joint interface through the exhaust vent, and closing the exhaust vent. However, this technique requires extra works of welding, exhausting and vent-closing operations, as described above. Moreover, in production of the aluminum clad member, cracks tend to be generated in the welded area of the periphery of the joint interface in an early stage of the hot rolling process, so that an ambient air enters the joint interface through the cracks, resulting in partial peeling and blister of the skin member, for example. Particularly in the case where the pressure at the joint interface is reduced in such a state wherein a member such as the joining assistance member according to the invention is disposed at the joint interface, the ambient air more easily enters the joint interface through the cracks generated in the welded area. The air entering the joint interface hinders enlargement of joined areas starting from the spot-like thick portions, resulting in a further increase of a risk of occurrence of the blister of the skin member, for example.

Therefore, the present invention has a characteristic that the clad rolling process is performed in a state wherein the predetermined joining assistance member 6 is disposed at the joint interface between the Al core member 2 and the Al skin member 4 to be cladded on each other, and the joint interface is communicated with the ambient air, without reduction of the pressure at the joint interface. In this respect, it is noted that the air existing at the joint interface before the clad rolling process is gradually exhausted from the joint interface along with reduction of a gap between the members to be joined together and the enlargement of the joined areas, so that a small amount of the air is finally left within the cells defined by the spot-like thick portions 10 and the portions of the Al wires 8 connecting the adjacent spot-like thick portions 10 with each other. However, the amount of the air left within the cells is extremely small, and the air is dispersed over the joint interface within each cell, so that the air left within the cells does not cause the peeling and blister of the skin member.

Namely, the joining assistance member 6 used in the method of producing the aluminum clad member according to the invention has a first function of restricting the sliding of the Al core member 2 and the Al skin member 4 to be joined together at their joint interface, and a second function of destructing the oxide films covering the surfaces of the Al core member 2 and the Al skin member 4 to promote joining of those members at their joint interface. On the other hand, the joining assistance member 6 is also deformed by the rolling force applied thereto during the clad rolling process. Accordingly, the oxide films covering surfaces of the Al wires 8 of the joining assistance member 6 are destructed by the deformation of the joining assistance member 6, whereby bondability of the joining assistance member 6 with respect to the Al core member 2 and the Al skin member 4 is improved. Thus, the joining assistance member 6 of the present invention has a third function of exhibiting its improved bondability with respect to the Al core member 2 and the Al skin member 4. In this respect, it is noted that in order to make the joining assistance member 6 exhibit its first and second functions described above, it is preferable that the Al wires 8 of the joining assistance member 6 have a strength not lower than those of the Al core member 2 and the Al skin member 4. However, the joining assistance member 6 can more easily exhibit its third function where the strength of the Al wires 8 is not higher than those of the Al core member 2 and the Al skin member 4. Accordingly, the strength of the Al wires 8 is not limited within a particular range. However, in order to improve the clad ratio distribution, it is necessary to restrict the sliding of the Al core member 2 and the Al skin member 4 at their joint interface, so that it is effective to increase the strength of the Al wires 8. In this case, the Al wires 8 are required to have a sufficiently high strength at a temperature of about 450-500° C., since the hot clad rolling process is generally performed at a temperature of about 450-500° C.

Mg is the most effective element (alloy component) to be added to the material of the Al wires 8 in order to increase their strength at a high temperature. Accordingly, the Al wires 8 formed of an Al—Mg-based alloy obtained by adding 1.5-6% by mass of Mg to aluminum is suitably used in the present invention. The Mg content in the Al wires 8 lower than 1.5% by mass results in an insufficient improvement of the strength of the Al wires 8, whereas the Mg content in the Al wires 8 higher than 6% by mass makes it difficult to produce the Al wires 8. Examples of the other elements which improve the strength of the Al wires 8 include Si, Cu, Mn and Zn. It is effective to add at least one of the above-indicated elements to the material of the Al wires 8 together with Mg. Further, in the present invention, it is effective to set the Mg content in the Al wires 8 so as to be higher than the Mg content in aluminum or an aluminum alloy of the Al core member 2 and the Al skin member 4.

On the other hand, in order to make the joining assistance member 6 (Al wires 8) disposed at the interface between the Al core member 2 and the Al skin member 4 more effectively exhibit its third function of joining those members 2 and 4 together, it is effective to chemically destruct and remove the oxide films covering the surfaces of the Al wires 8 by using an acid solution or an alkaline solution. This process of destructing and removing the oxide films using an acid or an alkali is generally called an etching treatment. Like the conventional etching treatment, the etching treatment with respect to the Al wires 8 is performed in the present invention by using aqueous solutions of acids such as a hydrofluoric acid, a sulfuric acid and a phosphoric acid, and aqueous solutions of alkalis such as sodium hydroxide and potassium hydroxide, which solutions are representative solutions used for the conventional etching treatment. Further, a nitric acid or the like is used to remove smuts generated by the etching treatment. Immediately after the etching treatment, oxide films are formed on the surfaces of the Al wires 8 by natural oxidation, but those oxide films are thinner and more brittle than the oxide films formed at the time of production of the Al wires 8, so that the oxide films formed by the natural oxidation can be more easily destructed by the rolling force applied to the Al wires 8 during the clad rolling process. Accordingly, the Al wires 8 subjected to the etching treatment can exhibit a higher degree of bondability with respect to the Al core member 2 and the Al skin member 4, than the Al wires 8 which are not subjected to the etching treatment.

Figure 3:
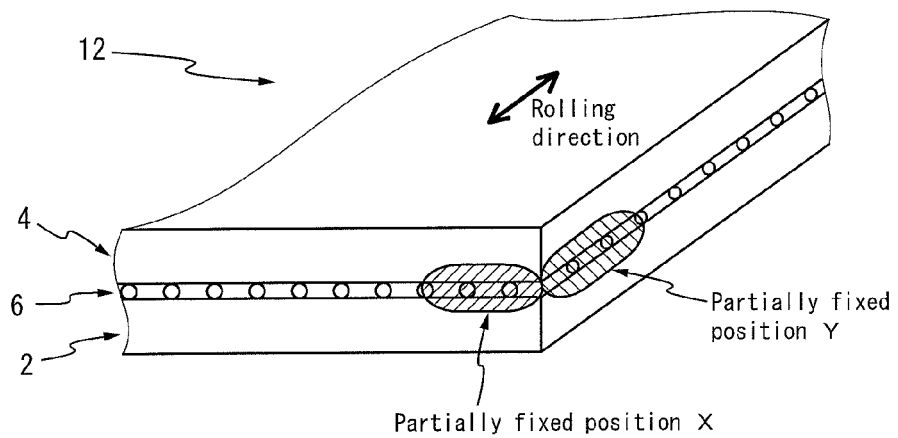
FIG. 3 is a fragmentary schematic perspective view showing the stack of FIG. 1 fixed by welding.

In the present invention, the hot clad rolling process is performed by: disposing the above-described joining assistance member 6 between mutually opposed surfaces of the Al core member 2 and the Al skin member 4 of a stack 12 obtained by superposing the Al skin member 4 on one or both of the opposite major surfaces of the Al core member 2 (see FIG. 3), in other words, disposing the joining assistance member 6 at the joint interface between the Al core member 2 and the Al skin member 4; and partially fixing together the Al core member 2, the joining assistance member 6 and the Al skin member 4 at their peripheral portions, such that the joint interface between the Al core member 2 and the Al skin member 4 is communicated with the ambient air, as described above. The hot clad rolling process may be performed without partially fixing together the Al core member 2, the joining assistance member 6 and the Al skin member 4. During the clad rolling process, the Al core member 2 or the Al skin member 4 is always elongated in a backward direction as seen in the rolling direction. In the case of partially fixing together the Al core member 2, the joining assistance member 6 and the Al skin member 4 at their peripheral portions, those members are preferably fixed together at transversely opposite end positions on opposite end faces of the stack 12 as seen in the rolling direction (in the longitudinal direction of the stack 12), as indicated by "Partially fixed position X" in FIG. 3. The Al core member 2, the joining assistance member 6 and the Al skin member 4 may be fixed together at longitudinally opposite end positions on opposite side faces of the stack 12 as seen in the direction perpendicular to the rolling direction (in the transverse direction of the stack 12), as indicated by "Partially fixed position Y" in FIG. 3. Further, in the present invention, the Al core member 2, the joining assistance member 6 and the Al skin member 4 may be fixed together at both of the above-described positions X and Y.

Generally, welding is advantageously employed as a method for partially fixing together the Al core member 2, the joining assistance member 6 and the Al skin member 4 at their peripheral portions. However, the method for partially fixing together those members is not limited to welding. Fixing (joining) methods such as brazing and FSW (friction stir welding) and a fastening method using aluminum fasteners or the like may be adequately employed as the method for partially fixing together those members. In the state wherein the joining assistance member 6 is disposed at the joint interface between the Al core member 2 and the Al skin member 4, those members 2, 4 and 6 are fixed together in a part of their peripheries, which part includes at least a peripheral portion of the above-described joint interface, whereby the joint interface is communicated with the ambient air, except in its peripheral portion at which the Al core member 2, the joining assistance member 6 and the Al skin member 4 are fixed together. In the case where a predetermined Al intermediate member is interposed between the Al core member 2 and the Al skin member 4 as described later, the Al core member 2, the joining assistance member 6 and the Al intermediate member are partially fixed together at their peripheral portions, while the Al intermediate member, the joining assistance member 6 and the Al skin member 4 are partially fixed together at their peripheral portions, so that those members are subjected to the clad rolling process in a state wherein joint interfaces between those members are communicated with the ambient air.

In the present invention, the stack 12 may be subjected to the clad rolling process without fixing together the Al core member 2, the joining assistance member 6 and the Al skin member 4 (or without fixing together the Al core member, the joining assistance member, the Al intermediate member and the Al skin member, or without fixing together the Al core member, the Al intermediate member, the joining assistance member and the Al skin member) so that the joint interface between those members is communicated with the ambient air. However, in the case where those members (2,6,4) of the stack 12 are not fixed together, there arises a problem in ease of handling of the stack 12 during a heating process and the like. Accordingly, it is possible to subject the stack 12 to the heating process and the like by fixing the stack 12 with a suitable fastening band, remove the fastening band from the stack 12 immediately before the clad rolling process, and start the clad rolling process by setting the unfixed stack 12 with respect to the rolls.

Elongation of the Al skin member 4 or the Al core member 2 can be advantageously restricted owing to the presence of the joining assistance member 6, as described above. However, in the case where the clad rolling process is performed in a single direction, the Al skin member 4 and the Al core member 2 are always elongated in the same direction, so that it is sometimes difficult to restrict the elongation of the Al skin member 4 or the Al core member 2, depending on their strength and the constitution of their materials. Therefore, in the case where the clad rolling process is performed by passing the stack between the rolls a plurality of times, it is preferable to perform a reverse rolling or reciprocatory rolling operation in which the direction of rotation of the rolls in odd-number passes and the direction of rotation of the rolls in even-number passes are opposite to each other, so that the rolling process is performed alternately in opposite two directions. Namely, it is effective to perform the rolling process in the opposite two directions by reversing the direction of rotation of the rolls at the end of each pass, so that the rolls are rotated in respective opposite two directions in the odd-number passes and in the even-number passes. Where the clad rolling process is performed by switching the rolling direction between the front and back directions, a strong rolling force is applied to the Al core member 2 and the joining assistance member 6 which are held in contact with each other, and the joining assistance member 6 and the Al skin member 4 which are held in contact with each other, at their opposite end portions as seen in the rolling direction, so that those end portions are joined together, leading to reduction of occurrence of peeling of the skin member in the joined areas.

In the present invention, the reverse rolling operation is advantageously performed by inserting the stack 12 of the Al core member 2, the joining assistance member 6 and the Al skin member 4 between a pair of upper and lower rolls without applying a load to the stack 12, and then applying a load to the stack 12 and rotating the rolls, such that the direction of rotation of the rolls is reversed each time the stack 12 is passed between the rolls. As a result, the elongation of the Al core member 2 or the Al skin member 4 can be more advantageously restricted than in the case where the rolling force is applied to the stack 12 when it is inserted between the rolls. In the case where the rolling force acts on the stack 12 when the stack 12 is inserted between the rolls at the first time in the first pass of the clad rolling process, the Al core member 2 or the Al skin member 4 is freely elongated in the backward direction as seen in the rolling direction, in the absence of restriction to its elongation, since the Al core member 2, the joining assistance member 6 and the Al skin member 4 are not joined together at all. On the other hand, where the rolling process is started in the state wherein the load is applied to the workpiece (stack 12) as described above, close adhesion between the joining assistance member 6 and the Al core and skin members 2 and 4 can be increased in the vicinity of the rolls, prior to the elongation of the Al core member 2 or the Al skin member 4, resulting in effective restriction of the free elongation of the Al core member 2 or the Al skin member 4. In this respect, it is noted that the load can be initially applied to the stack 12 by adjusting a gap between the rolls. However, in order to increase the close adhesion between the joining assistance member 6 and the Al core and skin members 2 and 4 with a high degree of accuracy, it is preferable to control the load to be initially applied to the stack 12. The load may be initially applied to the stack 12 at any position as seen in its longitudinal direction (rolling direction). Further, particularly in an early stage of the rolling process, the rolling pass may be repeated in the opposite two directions while controlling the load to be applied to the stack 12 to further increase the close adhesion between the joining assistance member 6 and the Al core and skin members 2 and 4.

By the way, both of the Al core member 2 and the Al skin member 4 which give the aluminum clad member produced according to the invention are plate members formed of known aluminum or aluminum alloys such as 1000 series aluminums or 2000-8000 series aluminum alloys according to JIS. It is particularly noted that the present invention permits production of the clad member by using the Al core member 2 and the Al skin member 4 which are formed of 5000 series, 6000 series or 7000 series aluminum alloys according to JIS, although production of the clad member using those aluminum alloys have been considered difficult. The aluminum and aluminum alloys used as the materials of the Al core member 2 and the Al skin member 4 are adequately selected depending on an application of the aluminum clad member to be obtained. For instance, where the aluminum clad member is to be used as a brazing sheet used for a heat exchanger or the like, the Al skin member 4 formed of an Al—Si-based aluminum alloy as a brazing filler metal is used in combination with the Al core member 2 formed of an Al—Mn-based aluminum alloy, and those members 4 and 2 are subjected to the clad rolling process.

In production of the aluminum clad member according to the invention, the plate members which are formed of the aluminum or aluminum alloys and which have predetermined thicknesses are generally used as the Al core member 2 and the Al skin member 4 of the stack 12 to be subjected to the hot clad rolling process. For instance, the Al core member 2 is obtained by subjecting an aluminum slab (thick planar block) formed of aluminum or an aluminum alloy to a scalping operation or the like, so that the aluminum slab has a predetermined thickness. On the other hand, a plate obtained by subjecting the above-described aluminum slab to the hot rolling process is used as the Al skin member 4. In the case where the plate which is obtained by the hot rolling process and used as the Al skin member 4 has a low degree of flatness, more evident effects of the invention can be achieved by increasing the thickness of the spot-like thick portions 10 of the joining assistance member 6 disposed at the joint interface, within the predetermined range. In the case where a surface of the above-described plate to be joined to the Al core member 2 is made smooth by a machining operation, the thickness of the spot-like thick portions 10 of the joining assistance member 6 can be reduced within the predetermined range.

The Al skin member 4 used in the present invention may take the form of a thick plate which is cut out from the aluminum slab. Further, the machining operation may be performed with respect to a surface of the thick plate to be joined to the Al core member 2, to smooth the above-described surface.

As another method of finishing the surfaces of the Al core member 2 and the Al skin member 4 to be joined together, it is possible to employ a method of brushing those surfaces with a metallic brush, in order to artificially roughen those surfaces. Also, it is effective to subject the above-described surfaces to the etching treatment, as in the case of the joining assistance member 6 (Al wires 8), if it is possible in terms of production equipment. In any case, in order to more sufficiently achieve the effects of the invention, it is effective to destruct the oxide films on the surfaces of the Al core member 2 and the Al skin member 4 by a suitable operation performed before the rolling process, and to artificially roughen the surfaces of those members 2 and 4 to be joined together, so as to increase resistance to the sliding of those members 2 and 4.

The present invention is also applicable to production of the aluminum clad member obtained by performing the hot clad rolling process with respect to a stack in which an Al intermediate member in the form of a plate of aluminum or an aluminum alloy is disposed between the Al core member 2 and the Al skin member 4, as well as the production of the aluminum clad member obtained by performing the hot clad rolling process with respect to the stack 12 in which the joining assistance member 6 is interposed between the Al core member 2 and the Al skin member 4. For instance, in the aluminum clad member used for the heat exchanger, the Al intermediate member in the form of a plate of an Al—Zn-based aluminum alloy which gives a sacrificial anode layer is disposed between the Al core member and the Al skin member, in order to increase corrosion resistance of the aluminum clad member. The present invention is also advantageously applicable to the production of the above-described aluminum clad member. In the production of the aluminum clad member constituted by the Al core member, the Al intermediate member and the Al skin member, the effects of the invention can be advantageously achieved where the hot clad rolling process is performed by disposing the joining assistance member according to the invention at at least one of a joint interface between the Al core member and the Al intermediate member and a joint interface between the Al intermediate member and the Al skin member.

Figure 4:
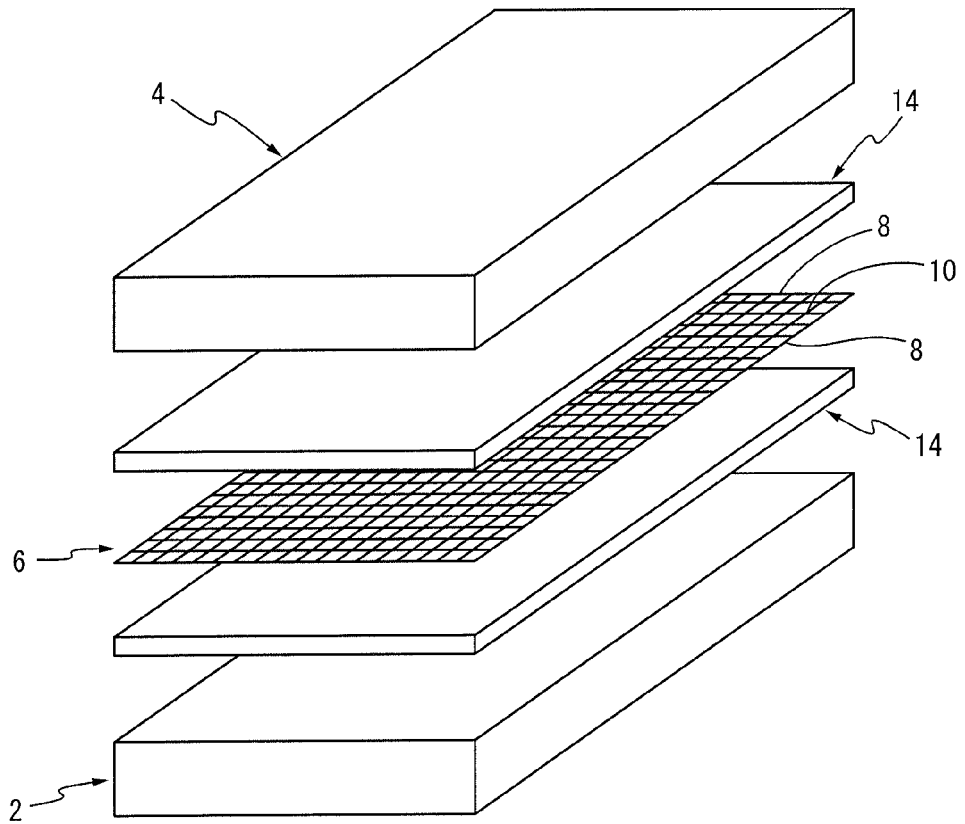
FIG. 4 is an exploded schematic perspective view showing a stack according to another embodiment of the invention, which stack consists of the Al skin member, the joining assistance member, Al sheets and the Al core member.

By the way, according to a particularly preferable form of the invention, the hot clad rolling process is performed by disposing an Al sheet 14 formed of an aluminum material containing 0-0.7% by mass of Mg on at least one of opposite sides of the above-described joining assistance member 6, such that the joining assistance member 6 and the Al sheet(s) 14 are interposed between the Al core member 2 and the Al skin member 4, as shown in FIG. 4, to promote joining of those members 2 and 4 at their joint interface owing to the presence of the Al sheet(s) 14. Each Al sheet 14 has a thickness which is adequately selected within a range of 5-200 μm, depending on the thicknesses of the Al skin member 4 and the Al intermediate member described later, at the time of their superposition on another member of the stack, and depending on the configuration of the joining assistance member, for example. Where the thickness of the Al sheet 14 is smaller than 5 μm, when the clad rolling process is performed in its early stage at a rolling reduction rate corresponding to a sum of the thicknesses of the joining assistance member 6 and the Al sheet 14, which are disposed at the interface between the Al core member 2 and the Al skin member 4, the spot-like thick portions 10 of the joining assistance member 6 are embedded into the Al sheet 14, whereby the Al sheet 14 is torn, resulting in generation of areas where the Al sheet 14 is not present, and giving rise to a risk of partial generation of unjoined areas. On the other hand, the thickness of the Al sheet 14 larger than 200 μm results in insufficiency of the effect of the spot-like thick portions 10 of the joining assistance member 6 to destruct the oxide films of the Al core member 2 and the Al skin member 4, giving rise to a risk of deterioration of bondability.

Where the Mg content in the aluminum material of the Al sheet 14 exceeds 0.7% by mass, the strength of the Al sheet 14 is increased, and oxide films covering surfaces of the Al sheet 14 become stiff, resulting in adverse effects on joining of the Al core member 2 and the Al skin member 4. The other components of the aluminum material of the Al sheet 14 are not particularly limited. However, it is more preferable that the Al sheet 14 is formed of pure aluminum or an aluminum material having a purity (aluminum content) of not lower than 99% by mass, since the Al sheet 14 formed of a material having a lower strength is more instantly and strongly pressed onto and joined to the skin member, the core member and the joining assistance member in the clad rolling process.

In order to improve the above-described function of the Al sheet 14, it is effective to chemically destruct and remove the oxide films covering the surfaces of the Al sheet 14, by using an acid solution or an alkaline solution, prior to the hot clad rolling process, as in the case of the oxide films covering the surfaces of the above-described Al skin member, Al core member and the Al intermediate member.

To perform the clad rolling process with respect to the predetermined Al skin member 4 and Al core member 2, by using the above-described joining assistance member 6 and Al sheet(s) 14, the Al sheet or sheets 14 is/are disposed on one or both of the opposite sides of the joining assistance member 6, and the Al sheet(s) 14 and the joining assistance member 6 are disposed at the joint interface between the Al skin member 4 and the Al core member 2, as shown in FIG. 4. The Al sheet 14, the joining assistance member 6, the Al sheet 14 and the Al skin member 4 may be superposed on the Al core member 2, in this order of description, to form a stack. It is also possible to employ another method in which a preformed stack is formed by disposing the Al sheets 14 on the respective opposite sides of the joining assistance member 6, and the thus formed preformed stack is disposed between the Al skin member 4 and the Al core member 2, to form a stack. In this respect, it is noted that where the Al skin member 4 or the Al core member 2 is formed of the pure aluminum or an aluminum material having an Al content not lower than 99.0% by mass and a high degree of bondability, the Al sheets 14 need not be disposed on both sides of the joining assistance member 6, and the Al sheet 14 may not be disposed between the joining assistance member 6 and the Al skin member 4, or the Al sheet 14 may not be disposed between the joining assistance member 6 and the Al core member 2. Also, in the case where the Al intermediate member which will be described later is formed of the pure aluminum or the aluminum material having the Al content not lower than 99.0% by mass and the high degree of bondability, the Al sheet 14 may not be disposed between the Al intermediate member and the joining assistance member 6, or the Al sheet 14 may not be disposed between the Al intermediate member or the joining assistance member 6 and the Al core member 2 or the Al skin member 4.

Further, the present invention is also applicable to a method of producing the aluminum clad member by performing the hot clad rolling process with respect to a stack in which at least one Al intermediate member in the form of a plate formed of aluminum or an aluminum alloy which is different from the materials of the Al core member 2 and the Al skin member 4 is interposed between the Al core member 2 and the Al skin member 4, as well as the method of producing the aluminum clad member by performing the hot clad rolling process with respect to the stack in which the joining assistance member 6 and the Al sheet(s) 14 disposed on one or both of the opposite sides of the joining assistance member 6 are disposed between the Al core member 2 and the Al skin member 4, as described above. For instance, in the aluminum clad member for a heat exchanger, an Al intermediate member in the form of a plate of an Al—Zn-based aluminum alloy giving a sacrificial anode layer is interposed between the Al core member 2 and the Al skin member 4, in order to increase corrosion resistance of the aluminum clad member. The present invention is advantageously applied to a method of production of the aluminum clad member constructed as described above. In the production of the aluminum clad member constituted by the Al skin member 4, the Al intermediate member and the Al core member 2, the effects of the invention can be advantageously achieved by performing the hot clad rolling process by disposing the joining assistance member 6 according to the invention and the Al sheet(s) 14 disposed on at least one of the opposite sides of the joining assistance member 6, at at least one of a joint interface between the Al skin member 4 and the Al intermediate member and a joint interface between the Al intermediate member and the Al core member 2. In this respect, it is noted that where the Al intermediate member is formed of a material having a high degree of bondability, such as the pure aluminum or an aluminum alloy which has the Al content not lower than 99.0% by mass and which does not contain Mg, the clad rolling process may be performed without disposing the Al sheets 14 on both sides of the Al intermediate member.

The hot clad rolling process is preferably performed with respect to the stack in which the joining assistance member 6 and the Al sheet(s) 14 disposed on one or both of the opposite sides of the joining assistance member 6 are interposed between the Al skin member 4 and the Al core member 2, after partially fixing together the Al skin member 4, the Al sheet 14, the joining assistance member 6, the Al sheet 14 and the Al core member 2, at their peripheral portions (see FIG. 3), such that mutually opposed surfaces of the members constituting the stack, namely, the joint interfaces between the members are communicated with the ambient air, as described above. The hot clad rolling process may be performed without partially fixing together the Al skin member 4, the Al sheet 14, the joining assistance member 6, the Al sheet 14 and the Al core member 2.

By performing the clad rolling process in the state wherein the predetermined joining assistance member 6 and the Al sheet(s) 14 disposed on one or both of the opposite sides of the joining assistance member 6 are interposed between the Al skin member 4 and the Al core member 2 to be cladded on each other, bondability of the Al skin member 4 and the Al core member 2 at their interface during the rolling process is effectively improved, so that the clad member which is difficult to be produced by the conventional method can be produced, and the clad member having high degrees of strength, formability and corrosion resistance, which properties are conventionally difficult to be achieved together, can be designed. Further, the yield of the clad member can be advantageously increased by the improved clad ratio distribution and the improved quality of the clad member such as reduction of occurrence of the blister of the skin member, resulting in reduction of the cost of production of the clad member. The thus obtained clad member having the above-described properties is expected to be used in many fields, for example, as a structural component of transportation equipment, a component in a driving system, a component in a controlling system, a multi-functional member for an electronic device and a high-performance member for a heat exchanger.

Although the method of producing the aluminum clad member according to the invention has been specifically described, it is to be understood that the invention is not limited to the details of the illustrated embodiments, and that the invention may be embodied with various other changes, modifications and improvements which are not illustrated herein and which may occur to those skilled in the art, without departing from the spirit of the invention, and that those changes, modifications and improvements are also within the scope of the invention.

EXAMPLES

To clarify the invention more specifically, some examples of the invention will be described. However, it is to be understood that the invention is by no means limited to the details of the examples.

Initially, Al ingots formed of various kinds of aluminum material (A to I) indicated in Table 1 given below were produced by a continuous casting process as in the conventional production of Al ingots, and Al core members, Al intermediate members and Al skin members were produced by using the thus obtained Al ingots. Namely, the Al core members were produced by subjecting the Al ingots (slabs) obtained by the continuous casting process to a conventional scalping operation, so that the Al core members have a thickness of 120-198 mm, a width of 200 mm and a length of 300 mm. The Al skin members and the Al intermediate members were produced by subjecting the Al ingots obtained by the casting process, to a hot rolling process, so that the thickness of the Al ingots was reduced to 2-80 mm, and then cutting the Al ingots into pieces each having a width of 200 mm and a length of 300 mm.

On the other hand, Al sheets were produced by forming Al ingots of various kinds of aluminum material (Q to T) indicated in Table 1, by the continuous casting process, and performing the scalping operation with respect to surfaces of the thus obtained Al ingots, and then subjecting the Al ingots to the hot rolling process, so that the thickness of the Al ingots was reduced to 3 mm. By removing cracked edges of end portions of the thus obtained hot-rolled sheets, the hot-rolled sheets having a width of 250 mm were obtained. Subsequently, the hot-rolled sheets were subjected to a cold rolling process, process annealing, and a further cold rolling process, to reduce the thickness of the sheets to 0.3 mm. Then, the sheets were subjected to a foil rolling process, such that the thus obtained foils have thicknesses within a range of 5-250 µm as indicated in Tables 10-12 given below. After the thus obtained foils were annealed, they were cut into pieces each having a width of 200 mm and a length of 300 mm, whereby the intended Al sheets were obtained.

As joining assistance members, various kinds of plain-weave wire cloth were produced by using Al wires which were formed of various kinds of Al alloy (J to P) indicated in Table 1 and which have a diameter within a range of 0.07-1.9 mm. The plain-weave wire cloths were formed by crossing the Al wires with each other in longitudinal and lateral directions to form a plain-weave structure. The thus obtained plain-weave wire cloths have spot-like thick portions which have a thickness within a range of 0.14-3.8 mm, depending on the diameter of the Al wires, and which are spaced apart from each other by a distance of 0.14-16 mm in the longitudinal and lateral directions.

TABLE 1

| Kind | Material | Chemical components (mass %) | | | | | | |
|---|---|---|---|---|---|---|---|---|
| | | Si | Fe | Cu | Mn | Mg | Zn | Al・X |
| Al skin member/Al core member/Al intermediate member | A | 0.1 | 0.3 | — | — | — | — | balance |
| | B | 0.3 | 0.6 | 0.1 | 1.2 | — | — | balance |
| | C | 0.1 | 0.1 | — | 0.6 | 4.5 | — | balance |
| | D | 0.4 | 0.2 | 0.3 | 0.1 | 0.7 | — | balance |
| | E | 0.1 | 0.3 | 1.7 | — | 2.5 | 5.5 | balance |
| | F | 10 | 0.2 | — | — | — | — | balance |
| | G | 10 | 0.3 | — | — | 1.5 | 0.1 | balance |
| | H | — | — | — | — | — | 3.5 | balance |
| | I | — | 0.3 | 0.3 | 0.8 | 5.5 | — | balance |
| Joining assistance member | J | 0.1 | 0.3 | — | — | 0.2 | — | balance |
| | K | — | — | — | — | 1 | — | balance |
| | L | 0.3 | 0.5 | — | — | 1.5 | — | balance |
| | M | 0.2 | 0.4 | — | 0.1 | 2.5 | — | balance |
| | N | 0.1 | 0.2 | — | — | 4 | — | balance |
| | O | 0.1 | 0.6 | — | 0.1 | 6 | — | balance |
| | P | — | — | — | — | 1.2 | — | balance |
| Al Sheet | Q | 0.1 | 0.2 | — | — | — | — | balance |
| | R | 0.1 | 0.3 | — | — | 0.3 | — | balance |
| | S | 0.1 | 0.1 | — | — | 0.6 | — | balance |
| | T | 0.2 | 0.1 | — | — | 0.8 | — | balance |

X・Al + inevitable impurities (a total amount of the inevitable impurities is not more than 0.5% by mass)

Among the members obtained as described above, the Al skin members, the Al intermediate members and the joining assistance members (plain-weave wire cloths) were subjected to a surface treatment, as necessary. Namely, the Al skin members and the Al intermediate members were used as hot rolled (without performing an etching treatment and by performing a degreasing treatment with respect to their joint surfaces by using acetone), or used after performing an alkali etching treatment with respect to their joint surfaces by using a 5% sodium hydroxide aqueous solution. Also, the joining assistance members were used without performing the etching treatment, or used after performing the alkali etching treatment by using the 5% sodium hydroxide aqueous solution.

Example 1

The various kinds of Al core member, Al intermediate member, Al skin member and joining assistance member having the dimensions of 200 mm×300 mm, which were obtained as described above, were superposed on each other in constitution indicated in Tables 2-4 given below. The members superposed on each other were fixed together by welding the thus obtained stacks over a length of 30 mm at transversely opposite end positions on opposite end faces of the stacks as seen in their longitudinal direction. Then, the stacks were heated to 480° C., and subjected to a hot clad rolling process in which the stacks were passed between rolls a plurality of times. The hot clad rolling process was initiated at a rolling reduction rate of 1% with respect to the thickness of the stacks, and the rolling reduction rate was increased in successive passes such that the $10^{th}$ pass was performed at the rolling reduction rate of 10% with respect to the thickness of the stacks. Further, the rolling direction was reversed at the end of each pass to perform a reverse rolling or reciprocatory rolling operation. Clad member No. 2 was produced by performing the first four passes in one direction, and performing the reverse rolling operation from the 5th pass. Clad member No. 12 was produced by initiating the hot clad rolling process from a longitudinally central portion of the stack. Intended clad members were produced by: reducing the thickness of the stacks to 3 mm by the hot rolling process; removing cracked edge portions of the thus obtained hot-rolled sheets, thereby obtaining the hot-rolled sheets having a width of 150 mm; reducing the thickness of the hot-rolled sheets to 1 mm by rolling the sheets using a cold-rolling mill; and annealing the sheets at 400° C. for two hours. In this respect, it is noted that in the production of the clad members, the hot rolling process was terminated before its completion in the event where considerable peeling of the skin member took place during the hot rolling process or the hot rolling process could not be continued due to unjoining of the members at their joint interface.

TABLE 2

| Clad member No. | Components | Material | Target clad ratio (%) | Spot-like thick portions Thickness (mm) | Spot-like thick portions Distance (mm) | Surface treatment (of joint surfaces) | Clad rolling process |
|---|---|---|---|---|---|---|---|
| 1 | Al skin member | F | 10 | — | — | — | Reverse rolling |
|   | Joining assistance member | M | — | 0.6 | 1.3 | — |   |
|   | Al core member | B | — | — | — | Scalping |   |
| 2 | Al skin member | F | 10 | — | — | — | 1st through 4th passes: performed in one direction; 5th pass~: Reverse rolling |
|   | Joining assistance member | M | — | 0.6 | 1.3 | — |   |
|   | Al core member | B | — | — | — | Scalping |   |
| 3 | Al skin member | F | 10 | — | — | — | Reverse rolling |
|   | Joining assistance member | N | — | 0.56 | 1.4 | — |   |
|   | Al core member | D | — | — | — | Scalping |   |
| 4 | Al skin member | F | 1 | — | — | — | Reverse rolling |
|   | Joining assistance member | M | — | 0.28 | 0.7 | — |   |
|   | Al core member | B | — | — | — | Scalping |   |
| 5 | Al skin member | A | 1 | — | — | — | Reverse rolling |
|   | Joining assistance member | O | — | 0.28 | 0.7 | — |   |
|   | Al core member | C | — | — | — | Scalping |   |
| 6 | Al skin member | A | 40 | — | — | — | Reverse rolling |
|   | Joining assistance member | O | — | 0.7 | 1.4 | — |   |
|   | Al core member | C | — | — | — | Scalping |   |
| 7 | Al skin member | A | 10 | — | — | — | Reverse rolling |
|   | Joining assistance member | P | — | 0.2 | 0.2 | — |   |
|   | Al core member | A | — | — | — | Scalping |   |
| 8 | Al skin member | G | 10 | — | — | — | Reverse rolling |
|   | Joining assistance member | L | — | 0.56 | 1.4 | — |   |
|   | Al core member | A | — | — | — | Scalping |   |
| 9 | Al skin member | C | 5 | — | — | — | Reverse rolling |
|   | Joining assistance member | O | — | 3.2 | 13 | Acid etching |   |
|   | Al core member | C | — | — | — | Scalping |   |
| 10 | Al skin member | C | 5 | — | — | Alkali etching | Reverse rolling |
|   | Joining assistance member | O | — | 3.2 | 13 | — |   |
|   | Al core member | C | — | — | — | Scalping |   |
| 11 | Al skin member | C | 5 | — | — | Wire brushing | Reverse rolling |
|   | Joining assistance member | O | — | 3.2 | 13 | — |   |
|   | Al core member | C | — | — | — | Scalping + Wire brushing |   |

TABLE 3

| Clad member No. | Components | Material | Target clad ratio (%) | Spot-like thick portions Thickness (mm) | Spot-like thick portions Distance (mm) | Surface treatment (of joint surfaces) | Clad rolling process |
|---|---|---|---|---|---|---|---|
| 12 | Al skin member | C | 5 | — | — | Alkali etching | Initiated from the central |
|   | Joining assistance member | O | — | 3.2 | 13 | Acid etching |   |

TABLE 3-continued

| Clad member No. | Components | Material | Target clad ratio (%) | Spot-like thick portions Thickness (mm) | Spot-like thick portions Distance (mm) | Surface treatment (of joint surfaces) | Clad rolling process |
|---|---|---|---|---|---|---|---|
| | Al core member | C | — | — | — | Scalping + Wire brushing | portion; Reverse rolling |
| 13 | Al skin member | G | 15 | — | — | — | Reverse rolling |
| | Joining assistance member | N | — | 0.28 | 0.7 | — | |
| | Al core member | B | — | — | — | Scalping | |
| | Joining assistance member | N | — | 0.28 | 0.7 | — | |
| | Al skin member | H | 15 | — | — | — | |
| 14 | Al skin member | F | 6 | — | — | — | Reverse rolling |
| | Joining assistance member | M | — | 0.56 | 1.4 | — | |
| | Al intermediate member | H | 10 | — | — | — | |
| | Joining assistance member | O | — | 0.56 | 1.4 | — | |
| | Al core member | B | — | — | — | Scalping | |
| 15 | Al skin member | B | 10 | — | — | — | Reverse rolling |
| | Joining assistance member | O | — | 3.2 | 13 | — | |
| | Al core member | E | — | — | — | Scalping | |
| 16 | Al skin member | G | 10 | — | — | — | Reverse rolling |
| | Joining assistance member | K | — | 0.56 | 1.4 | — | |
| | Al core member | A | — | — | — | Scalping | |
| 17 | Al skin member | C | 5 | — | — | — | Reverse rolling |
| | Joining assistance member | O | — | 3.2 | 13 | — | |
| | Al core member | C | — | — | — | Scalping | |
| 18 | Al skin member | C | 15 | — | — | Alkali etching | Reverse rolling |
| | Joining assistance member | — | — | — | — | — | |
| | Al core member | C | — | — | — | Scalping | |
| 19 | Al skin member | F | 10 | — | — | Alkali etching | Reverse rolling |
| | Joining assistance member | — | — | — | — | — | |
| | Al core member | B | — | — | — | Scalping | |
| 20 | Al skin member | F | 10 | — | — | Alkali etching | Reverse rolling |
| | Joining assistance member | — | — | — | — | — | |
| | Al core member | D | — | — | — | Scalping | |
| 21 | Al skin member | F | 1 | — | — | Alkali etching | Reverse rolling |
| | Joining assistance member | — | — | — | — | — | |
| | Al core member | B | — | — | — | Scalping | |

TABLE 4

| Clad member No. | Components | Material | Target clad ratio (%) | Spot-like thick portions Thickness (mm) | Spot-like thick portions Distance (mm) | Surface treatment (of joint surfaces) | Clad rolling process |
|---|---|---|---|---|---|---|---|
| 22 | Al skin member | A | 1 | — | — | Alkali etching | Reverse rolling |
| | Joining assistance member | — | — | — | — | — | |
| | Al core member | C | — | — | — | Scalping | |
| 23 | Al skin member | A | 1 | — | — | Alkali etching | Reverse rolling |
| | Joining assistance member | O | — | 3.5 | 13 | — | |
| | Al core member | C | — | — | — | Scalping | |
| 24 | Al skin member | A | 40 | — | — | Alkali etching | Reverse rolling |
| | Joining assistance member | — | — | — | — | — | |
| | Al core member | C | — | — | — | Scalping | |
| 25 | Al skin member | A | 10 | — | — | Alkali etching | Reverse rolling |
| | Joining assistance member | — | — | — | — | — | |
| | Al core member | A | — | — | — | Scalping | |

TABLE 4-continued

| Clad member No. | Components | Material | Target clad ratio (%) | Spot-like thick portions Thickness (mm) | Spot-like thick portions Distance (mm) | Surface treatment (of joint surfaces) | Clad rolling process |
|---|---|---|---|---|---|---|---|
| 26 | Al skin member | A | 10 | — | — | Alkali etching | Reverse rolling |
|  | Joining assistance member | P | — | 0.14 | 0.14 | — |  |
|  | Al core member | A | — | — | — | Scalping |  |
| 27 | Al skin member | G | 10 | — | — | — | Reverse rolling |
|  | Joining assistance member | — | — | — | — | — |  |
|  | Al core member | A | — | — | — | Scalping |  |
| 28 | Al skin member | C | 5 | — | — | Alkali etching | Reverse rolling |
|  | Joining assistance member | — | — | — | — | — |  |
|  | Al core member | C | — | — | — | Scalping |  |
| 29 | Al skin member | C | 5 | — | — | Alkali etching | Reverse rolling |
|  | Joining assistance member | O | — | 3.8 | 16 | — |  |
|  | Al core member | C | — | — | — | Scalping |  |
| 30 | Al skin member | F | 15 | — | — | Alkali etching | Reverse rolling |
|  | Joining assistance member | — | — | — | — | — |  |
|  | Al core member | B | — | — | — | Scalping |  |
|  | Joining assistance member | — | — | — | — | — |  |
|  | Al skin member | F | 15 | — | — | Alkali etching |  |
| 31 | Al skin member | B | 10 | — | — | Alkali etching | Reverse rolling |
|  | Joining assistance member | — | — | — | — | — |  |
|  | Al core member | E | — | — | — | Scalping |  |

Each of the various kinds of aluminum clad member obtained as described above was observed of its appearance, evaluated in terms of occurrence of peeling and blister of the skin member and surface smoothness, and measured of the clad ratio of the skin member. Results of the observation, evaluation and measurement are indicated in Tables 5-7 given below, as well as results of a comprehensive evaluation of the aluminum clad member. The surface smoothness of each aluminum clad member was evaluated based on a maximum height: Rmax obtained by measuring the clad member after the annealing, by using a surface roughness tester and setting a measurement range at 4 mm along the rolling direction and setting a cut-off value at 0.8 mm. The surface smoothness of the aluminum clad member was evaluated as "Good" where the maximum height: Rmax is not larger than 5.0 μm, and "Poor" where the maximum height: Rmax is larger than 5.0 μm. Each clad member was observed at 10 positions in its cross section, and the clad ratio was calculated from measured values of a thickness of the skin member and a thickness of the clad member as a whole. A clad ratio distribution was evaluated as "Excellent" where a variation in the clad ratios at the 10 positions (difference between the highest clad ratio and the lowest clad ratio) is not larger than 5% of the target clad ratio, "Good" where the variation in the clad ratios is larger than 5% and not larger than 10% of the target clad ratio, and "Poor" where the variation in the clad ratios is larger than 10% of the target clad ratio. The result of the comprehensive evaluation of each aluminum clad members is indicated as "Good" where the aluminum clad member has no problems in terms of the occurrence of peeling of the skin member during the rolling process, occurrence of blister of the skin member, the surface smoothness and the clad ratio distribution, and "Poor" where the aluminum clad member has at least one problem in the above-described points.

TABLE 5

| Clad member No. | Results of rolling process | | | | | | |
|---|---|---|---|---|---|---|---|
|  | Peeling of the skin member | Blister of the skin member | Surface smoothness | | Clad ratio | | Comprehensive Evaluation |
|  |  |  | Appearance | Evaluation | Distribution (%) | Evaluation |  |
| 1 | None | None | Smooth | Good | 9.6~10.2 | Good | Good |
| 2 | None | None | Smooth | Good | 9.4~10.3 | Good | Good |
| 3 | None | None | Smooth | Good | 9.8~10.1 | Excellent | Excellent |
| 4 | None | None | Smooth | Good | 0.97~1.11 | Good | Good |
| 5 | None | None | Smooth | Good | 0.95~1.04 | Good | Good |
| 6 | None | None | Smooth | Good | 38.3~41.9 | Good | Good |
| 7 | None | None | Smooth | Good | 9.8~10.2 | Excellent | Excellent |
| 8 | None | None | Smooth | Good | 9.7~10.1 | Excellent | Excellent |
| 9 | None | None | Smooth | Good | 4.8~5.2 | Good | Good |
| 10 | None | None | Smooth | Good | 4.7~5.1 | Good | Good |
| 11 | None | None | Smooth | Good | 4.8~5.2 | Good | Good |

TABLE 5-continued

| Clad member No. | Peeling of the skin member | Blister of the skin member | Surface smoothness Appearance | Surface smoothness Evaluation | Clad ratio Distribution (%) | Clad ratio Evaluation | Comprehensive Evaluation |
|---|---|---|---|---|---|---|---|
| 12 | None | None | Smooth | Good | 4.9~5.1 | Excellent | Excellent |
| 13 | None | None | Smooth | Good | G: 14.5~15.8 H: 14.1~15.4 | Good | Good |
| 14 | None | None | Smooth | Good | F: 5.7~6.1 H: 9.4~10.2 | Good | Good |
| 15 | None | None | Smooth | Good | 9.6~10.5 | Good | Good |

TABLE 6

| Clad member No. | Peeling of the skin member | Blister of the skin member | Surface smoothness Appearance | Surface smoothness Evaluation | Clad ratio Distribution (%) | Clad ratio Evaluation | Comprehensive Evaluation |
|---|---|---|---|---|---|---|---|
| 16 | None | None | Smooth | Good | 9.4~10.3 | Good | Good |
| 17 | None | None | Smooth | Good | 4.8~5.2 | Good | Good |
| 18 | Rolling process was terminated since peeling of the skin member took place due to unjoining of the members | Could not be evaluated | Could not be evaluated | | Could not be evaluated | | Poor |
| 19 | Peeling of the skin member took place in opposite end portions as seen in the rolling direction | Partial blister took place | Smooth | Good | 9.0~10.3 | Poor | Poor |
| 20 | None | Partial blister took place | Smooth | Good | 9.2~10.4 | Poor | Poor |
| 21 | Rolling process was terminated since peeling of the skin member took place due to unjoining of the members | Could not be evaluated | Could not be evaluated | | Could not be evaluated | | Poor |
| 22 | Rolling process was terminated since peeling of the skin member took place due to unjoining of the members | Could not be evaluated | Could not be evaluated | | Could not be evaluated | | Poor |
| 23 | Peeling of the skin member took place in opposite end portions as seen in the rolling direction | Partial blister took place | Entire surface area had irregularities | Poor | 0.94~1.03 | Good | Poor |

TABLE 7

| Clad member No. | Peeling of the skin member | Blister of the skin member | Surface smoothness Appearance | Surface smoothness Evaluation | Clad ratio Distribution (%) | Clad ratio Evaluation | Comprehensive Evaluation |
|---|---|---|---|---|---|---|---|
| 24 | Rolling process was terminated since peeling of the skin member took place due to unjoining of the members | Could not be evaluated | Could not be evaluated | | Could not be evaluated | | Poor |
| 25 | Rolling process was terminated since peeling of the skin member took place due to unjoining of the members | Could not be evaluated | Could not be evaluated | | Could not be evaluated | | Poor |
| 26 | Peeling of the skin member took place in an end portion as seen in the rolling direction | None | Smooth | Good | 8.9~10.3 | Poor | Poor |
| 27 | Peeling of the skin member took place in an end portion as seen in the rolling direction | Partial blister took place | Small cracks were generated in the entire surface area of the skin member | Poor | 10.2~12.1 | Poor | Poor |
| 28 | Rolling process was terminated since peeling of the skin member took place due to unjoining of the members | Could not be evaluated | Could not be evaluated | | Could not be evaluated | | Poor |
| 29 | None | Partial blister took place | Entire surface area had irregularities | Poor | 4.5~5.2 | Poor | Poor |
| 30 | None | Partial blister took place | Smooth | Good | F: 13.9~15.6 F: 13.5~15.8 | Poor | Poor |

TABLE 7-continued

| | | Results of rolling process | | | | | |
|---|---|---|---|---|---|---|---|
| Clad member No. | Peeling of the skin member | Blister of the skin member | Surface smoothness Appearance | Evaluation | Clad ratio Distribution (%) | Evaluation | Compre- hensive Evaluation |
| 31 | Rolling process was terminated since peeling of the skin member took place due to unjoining of the members | Could not be evaluated | Could not be evaluated | | Could not be evaluated | | Poor |

As is apparent from the results in Tables 2-4 and Tables 5-7, occurrences of the peeling and the blister of the skin member were not recognized in the aluminum clad members Nos. 1-17 produced according to the invention, and those aluminum clad members had no problems in terms of the surface smoothness. Further, the aluminum clad members Nos. 1-17 had the variation in the clad ratio (difference between the highest clad ratio and the lowest clad ratio) not larger than 10% of the target clad ratio (in the case where the target clad ratio was 10%, the difference between the highest clad ratio and the lowest clad ratio was not larger than 1%).

Specifically, the clad member No. 1 had a difference of 0.6% between the highest and lowest clad ratios, whereas the clad member No. 2 produced by performing the $1^{st}$ through $4^{th}$ passes of the clad rolling process in a single direction had a larger difference of 0.9% between the highest and lowest clad ratios. However, the clad ratio distribution of the clad member No. 2 is more even than in those of the clad members Nos. 18-22, 24-25, 27-28 and 30-31 produced without using the joining assistance member, and the peeling and the blister of the skin member were not recognized in the clad member No. 2.

Further, it was confirmed that the aluminum clad members Nos. 4-6 produced by employing the clad ratios which are considered difficult or impossible to achieve in factory production had excellent qualities and did not suffer from any problems. It was revealed that the present invention permits considerable mitigation of limitation of the clad ratio, which is generally within a range between about 5% and about 25%.

In addition, it was confirmed that good results can be achieved in the clad members Nos. 3, 7, 8 and 9-12 produced by using the core members and the skin members which are difficult to be joined together. The clad member No. 3 was produced by using the core member formed of an Al—Mg—Si alloy; the clad member No. 7 was produced by using the core member and the skin member formed of the same material; the clad member No. 8 was produced by using the core member which is soft and liable to elongation, and the skin member which is liable to cracking; and the clad members Nos. 9-12 were produced by using the core member and the skin member formed of the same material having a low degree of clad-rolling workability. It was confirmed that the surface treatment (chemical treatment or mechanical treatment) performed with respect to the core member, the joining assistance member or the skin member was particularly effective in production of the clad members Nos. 9-12, and extremely even clad ratio distribution was achieved in the clad member No. 12 produced by optimizing the surface treatment and the rolling process.

Further, it was confirmed that good results can be achieved in the double-sided aluminum clad member (No. 13), the clad member (No. 14) having the intermediate member and the clad member (No. 15) having the core member formed of a heat-treated alloy, which clad members Nos. 13-15 were produced according to the invention. The properties of the clad members Nos. 16 and 17 are inferior to those of the clad members Nos. 8 and 12, but are satisfactory for practical use of the clad members. Therefore, the above-described results reveal that the present invention not only permits mitigation of the limitation of the clad ratio, but also permits mitigation of limitations in terms of the materials and constitution of the members to be cladded on each other, which materials and constitution have been considered difficult to employ in production of the clad member by the clad rolling process.

On the other hand, the clad members Nos. 18-31 as comparative examples have various inherent problems. Namely, the clad members Nos. 18, 28 and 29 having constitution of the materials (the core member and the skin member which are formed of the same material having a high Mg content) which are extremely difficult to be cladded on each other by the clad rolling process could not be produced without using the joining assistance member. Even though the clad member No. 29 was produced by using the joining assistance member, the clad member No. 29 had lower quality since the joining assistance member used in its production was outside the scope of this invention.

The clad members Nos. 19 and 20 have constitution of the materials which are not difficult to be cladded on each other by the clad rolling process, and could be produced without using the joining assistance member according to the invention. However, the clad members Nos. 19 and 20 suffered from partial blister of the skin member, and had the difference between the highest and lowest clad ratios of the skin member, which difference is larger than 10% of the target clad ratio. Although those clad members can be used as products by removing their inflating portions and portions having the clad ratio outside the tolerable range, this removal results in considerable reduction of their yield.

In production of the clad members Nos. 21 and 22, the clad ratio of the skin member was as low as 1% and the joining assistance member was not used, so that the peeling of the skin member took place during the clad rolling process, and the clad rolling process could not be completed. The clad member No. 23 was also produced with the low clad ratio of the skin member, but the clad rolling process could be completed in production of the clad member No. 23 owing to the use of the joining assistance member. However, it was recognized that the surface of the clad member No. 23 had small irregularities generated by the use of the soft thin skin member and the joining assistance member having the spot-like thick portions of a large thickness, and the joining assistance member partially embedded in the skin member, resulting in partial reduction of the clad ratio of the skin member. In production of the clad member No. 24, the clad ratio of the skin member was as high as 40% and the joining assistance member was not used, so that the peeling of the skin member took place during the rolling process due to an insufficient joint strength at the joint interface, resulting in failure to complete the clad rolling process.

In production of the clad members Nos. 25 and 26, the core member and the skin member were formed of the same soft material. The clad member No. 25 could not be produced by the clad rolling process, since the joining assistance member was not used. In production of the clad member No. 26, an effect of the joining assistance member to grip together the core member and the skin member could not be effectively exhibited, since the spot-like thick portions of the joining assistance member have a small thickness and a small distance from each other. As a result, slight peeling of the skin member took place in an end portion of the clad member No. 26 as seen in the rolling direction, and the difference between the highest and lowest clad ratios was 14% of the target clad ratio. The clad member No. 27 was produced by using the core member formed of a soft pure aluminum and the skin member formed of an Al—Si—Mg alloy which is soft and liable to generation of small cracking. In production of the clad member No. 27, the core member and the skin member were not sufficiently joined together, since they are formed of the above-described materials which are difficult to be cladded on each other by the clad rolling process, and the joining assistance member was not used, so that the peeling of the skin member took place in an end portion of the clad member No. 27 as seen in the rolling direction, and generation of small cracks was recognized over the entire surface area of the skin member.

In production of the double-sided aluminum clad member (No. 30) and the aluminum clad member (No. 31) having the Al core member formed of a heat-treated aluminum alloy, the joining assistance member was not used, so that the clad member No. 30 suffered from the blister of the skin member and poor clad ratio distribution, and the clad member No. 31 could not be produced.

Example 2

Among the alloy materials indicated in Table 1, the materials A, C and E were used as the materials of the Al skin member and the Al core member in combinations of: the Al skin member formed of the material A and the Al core member formed of the material E; and the Al skin member formed of the material C and the Al core member formed of the material C. Two clad members were produced by using each of the above-described combinations, as indicated in Table 8 given below. The Al core members were produced by subjecting ingots obtained by a continuous casting process to a scalping operation, so that the Al core members have a thickness of 380 mm, a width of 400 mm and a length of 600 mm. The Al skin members (brazing filler metals) were produced by subjecting the ingots obtained by the casting process, to a hot rolling process, so that the thickness of the ingots was reduced to 20 mm, and then cutting the ingots into pieces each having a width of 400 mm and a length of 600 mm. As the joining assistance members, there were used plain-weave wire cloths having configurations indicated in Table 8, and formed from Al wires of an Al—Mg alloy (material N or O) which has a Mg content of 4% by mass or 6% by mass, and which was used in the Example 1.

One of the two clad members was produced by partially fixing by welding the perimeter (peripheral portion) of the interface between the Al core member and the Al skin member, as in the Example 1, then heating the stack of the Al core member and the Al skin member to a predetermined temperature, and initiating the clad rolling process by setting a target clad ratio of the Al skin member at 5%. The other of the two clad members was produced by the steps of: welding the whole perimeter of the interface between the Al core member and the Al skin member; exhausting the air from the joint interface between the Al core member and the Al skin member, through an exhaust pipe attached by welding to a central portion of one of longitudinally opposite end faces of the stack, thereby reducing the pressure at the joint interface to 2 Pa; closing the opening of the exhaust pipe by crushing the pipe; heating the stack to a predetermined temperature, as in the Example 1; and initiating the clad rolling process by setting a target clad ratio of the Al skin member at 5%. In this respect, it is noted that the hot rolling process is generally performed with respect to aluminum materials by using an emulsion in the form of a mixture of water and an oil, as a lubricant, so that the clad rolling process of this Example was also performed by using the emulsion, as in the conventional hot rolling process performed with respect to the aluminum members.

The clad members obtained as described above were evaluated as in the Example 1. Results of the evaluation are indicated in Table 9 given below.

TABLE 8

| Clad member No. | Components | Material | Target clad ratio (%) | Spot-like thick portions Thickness (mm) | Distance (mm) | Surface treatment (of joint surfaces) | Fixing by welding | Clad rolling process |
|---|---|---|---|---|---|---|---|---|
| 32 | Al skin member | A | 5 | — | — | — | Partial welding | Reverse rolling |
|  | Joining assistance member | N | — | 0.56 | 1.4 | — |  |  |
|  | Al core member | E | — | — | — | Scalping |  |  |
| 33 | Al skin member | C | 5 | — | — | — | Partial welding | Reverse rolling |
|  | Joining assistance member | O | — | 0.6 | 1.3 | — |  |  |
|  | Al core member | C | — | — | — | Scalping |  |  |
| 34 | Al skin member | A | 5 | — | — | — | Whole perimeter was welded and the air was exhausted from the joint interface to reduce the pressure to 2 Pa | Reverse rolling |
|  | Joining assistance member | N | — | 0.56 | 1.4 | — |  |  |
|  | Al core member | E | — | — | — | Scalping |  |  |

TABLE 8-continued

| Clad member No. | Components | Material | Target clad ratio (%) | Spot-like thick portions Thickness (mm) | Spot-like thick portions Distance (mm) | Surface treatment (of joint surfaces) | Fixing by welding | Clad rolling process |
|---|---|---|---|---|---|---|---|---|
| 35 | Al skin member | C | 5 | — | — | — | Whole perimeter was welded and the air was exhausted from the joint interface to reduce the pressure to 2 Pa | Reverse rolling |
|  | Joining assistance member | O | — | 0.6 | 1.3 | — |  |  |
|  | Al core member | C | — | — | — | Scalping |  |  |

TABLE 9

| | | | Results of rolling process | | |
|---|---|---|---|---|---|
| Clad member No. | Peeling of the skin member | Blister of the skin member | Surface smoothness Appearance | Evaluation | Comprehensive Evaluation |
| 32 | None | None | Smooth | Good | Good |
| 33 | None | None | Smooth | Good | Good |
| 34 | None | Present | Raised portions were formed by blister | Poor | Poor |
| 35 | None | Present | Raised portions were formed by blister | Poor | Poor |

By the way, in the case where the emulsion enters the interface between the members superposed on each other during the hot rolling process performed in production of the above-described clad members, the emulsion entering the interface causes the blister. In order to prevent entry of the emulsion into the interface, it is effective to exhaust the air remaining at the interface, along with a progress of the rolling process. In order to secure a wide vent for exhausting the air, it is preferable to perform the hot rolling process by partially fixing together the Al core member and the Al skin member by welding, or without fixing together those members at all by welding. As indicated in Tables 8 and 9, it was recognized that the clad members Nos. 32 and 33 produced by partially fixing together the Al core member and the Al skin member by welding did not suffer from the peeling and the blister of the skin member, and had no problems in the surface smoothness.

On the other hand, as is apparent from Tables 8 and 9, the blister of the skin member was recognized in the clad members Nos. 34 and 35 produced by performing the clad rolling process in the state wherein the whole perimeter of the interface between the Al core member and the Al skin member was welded, and the pressure at the joint interface was reduced. In the clad members Nos. 34 and 35, the blister of the skin member concentrated in their widthwise end portions, and was also recognized in a part of their widthwise central portions. In the case where the pressure at the joint interface is reduced by welding the whole perimeter of the stack, as described above, a high-temperature air including oil particles and water vapor rapidly enters the joint interface through cracks generated in weld beads during the hot clad rolling process, whereby the high-temperature air entering the joint interface hinders joining of the Al core member and the Al skin member at their joint interface, and causes the blister of the skin member. It can be understood from the above-described results that the quality of the clad members is considerably deteriorated where the technique of reducing the pressure at the joint interface is employed in the clad rolling process performed with respect to the aluminum members.

Example 3

The various kinds of Al skin member, Al core member, joining assistance member, Al sheet and Al intermediate member, which were produced as described above, were superposed on each other in constitution indicated in Tables 10-12 given below. The thus obtained stacks were partially welded at their corners over a length of 30 mm in the directions of their width and length, to fix together the members superposed on each other. In this respect, it is noted that the joint interfaces between the members of the partially welded stacks were communicated with the ambient air. Subsequently, the stacks were heated to 480° C., and subjected to a hot clad rolling process in which the stacks were passed between rolls a plurality of times. The hot clad rolling process was initiated at a rolling reduction rate of 0.5% with respect to the thickness of the stacks, and the rolling reduction rate was increased in successive passes such that the $10^{th}$ pass was performed at the rolling reduction rate of 10% with respect to the thickness of the stacks. Further, the rolling direction was reversed at the end of each pass to perform a reverse rolling operation. Intended clad members were produced by: reducing the thickness of the stacks to 3 mm by the hot rolling process; removing cracked edges of end portions of the thus obtained hot-rolled sheets, thereby obtaining the hot-rolled sheets having a width of 150 mm; reducing the thickness of the hot-rolled sheets to 1 mm by rolling the sheets using a cold-rolling mill; and annealing the sheets at 400° C. for two hours. In this respect, it is noted that in production of the clad members, the hot rolling process was terminated before its completion in the event where considerable peeling of the skin member took place during the hot rolling process or the hot rolling process could not be continued due to unjoining of the members at their joint interface.

TABLE 10

| Clad member No. | Components | Material | Thickness before rolling process | Target clad ratio (%) | Spot-like thick portions Thickness (mm) | Spot-like thick portions Distance (mm) | Etching treatment | Clad rolling process |
|---|---|---|---|---|---|---|---|---|
| 36 | Al skin member | F | 20 mm | 10 | — | — | none | Reverse rolling |
|  | Al sheet | S | 20 μm | — | — | — | — |  |
|  | Joining assistance member | J | — | — | 0.6 | 1.3 | none |  |
|  | Al sheet | S | 20 μm | — | — | — | — |  |
|  | Al core member | B | 180 mm | — | — | — | — |  |
| 37 | Al skin member | F | 20 mm | 10 | — | — | none | Reverse rolling |
|  | Al sheet | Q | 50 μm | — | — | — | — |  |
|  | Joining assistance member | M | — | — | 0.6 | 1.3 | none |  |
|  | Al sheet | Q | 50 μm | — | — | — | — |  |
|  | Al core member | B | 180 mm | — | — | — | — |  |
| 38 | Al skin member | F | 20 mm | 10 | — | — | performed | Reverse rolling |
|  | Al sheet | R | 50 μm | — | — | — | — |  |
|  | Joining assistance member | J | — | — | 0.56 | 1.4 | performed |  |
|  | Al sheet | R | 50 μm | — | — | — | — |  |
|  | Al core member | D | 180 mm | — | — | — | — |  |
| 39 | Al skin member | A | 20 mm | 10 | — | — | none | Reverse rolling |
|  | Joining assistance member | N | — | — | 0.56 | 1.4 | none |  |
|  | Al sheet | Q | 50 μm | — | — | — | — |  |
|  | Al core member | B | 180 mm | — | — | — | — |  |
| 40 | Al skin member | B | 2 mm | 1 | — | — | none | Reverse rolling |
|  | Al sheet | Q | 30 μm | — | — | — | — |  |
|  | Joining assistance member | O | — | — | 0.28 | 0.7 | none |  |
|  | Al sheet | Q | 30 μm | — | — | — | — |  |
|  | Al core member | E | 198 mm | — | — | — | — |  |
| 41 | Al skin member | A | 80 mm | 40 | — | — | none | Reverse rolling |
|  | Al sheet | S | 50 μm | — | — | — | — |  |
|  | Joining assistance member | M | — | — | 0.7 | 1.4 | none |  |
|  | Al sheet | S | 50 μm | — | — | — | — |  |
|  | Al core member | E | 120 mm | — | — | — | — |  |
| 42 | Al skin member | G | 20 mm | 10 | — | — | performed | Reverse rolling |
|  | Al sheet | Q | 30 μm | — | — | — | — |  |
|  | Joining assistance member | L | — | — | 0.2 | 0.25 | none |  |
|  | Al core member | A | 180 mm | — | — | — | — |  |
| 43 | Al skin member | C | 10 mm | 5 | — | — | none | Reverse rolling |
|  | Al sheet | Q | 200 μm | — | — | — | — |  |
|  | Joining assistance member | O | — | — | 3.2 | 13 | none |  |
|  | Al sheet | Q | 200 μm | — | — | — | — |  |
|  | Al core member | C | 190 mm | — | — | — | — |  |

TABLE 11

| Clad member No. | Components | Material | Thickness before rolling process | Target clad ratio (%) | Spot-like thick portions Thickness (mm) | Spot-like thick portions Distance (mm) | Etching treatment | Clad rolling process |
|---|---|---|---|---|---|---|---|---|
| 44 | Al skin member | C | 10 mm | 5 | — | — | performed | Reverse rolling |
|  | Al sheet | Q | 30 μm | — | — | — | — |  |
|  | Joining assistance member | N | — | — | 0.2 | 0.25 | none |  |
|  | Al sheet | Q | 30 μm | — | — | — | — |  |
|  | Al core member | C | 190 mm | — | — | — | — |  |
| 45 | Al skin member | C | 10 mm | 5 | — | — | none | Reverse rolling |
|  | Al sheet | Q | 100 μm | — | — | — | — |  |
|  | Joining assistance member | O | — | — | 3.2 | 13 | none |  |
|  | Al sheet | Q | 100 μm | — | — | — | — |  |
|  | Al core member | C | 190 mm | — | — | — | — |  |
| 46 | Al skin member | C | 10 mm | 5 | — | — | performed | Reverse rolling |
|  | Al sheet | Q | 5 μm | — | — | — | — |  |
|  | Joining assistance member | O | — | — | 0.7 | 1.4 | performed |  |

TABLE 11-continued

| Clad member No. | Components | Material | Thickness before rolling process | Target clad ratio (%) | Spot-like thick portions Thickness (mm) | Spot-like thick portions Distance (mm) | Etching treatment | Clad rolling process |
|---|---|---|---|---|---|---|---|---|
| | Al sheet | Q | 5 μm | — | — | — | — | |
| | Al core member | C | 190 mm | — | — | — | — | |
| 47 | Al skin member | B | 20 mm | 10 | — | — | none | Reverse rolling |
| | Al sheet | R | 100 μm | — | — | — | — | |
| | Joining assistance member | N | — | — | 3.2 | 13 | none | |
| | Al sheet | R | 100 μm | — | — | — | — | |
| | Al core member | E | 180 mm | — | — | — | — | |
| 48 | Al skin member | G | 20 mm | 10 | — | — | none | Reverse rolling |
| | Al sheet | Q | 30 μm | — | — | — | — | |
| | Joining assistance member | N | — | — | 0.56 | 1.4 | none | |
| | Al sheet | Q | 30 μm | — | — | — | — | |
| | Al core member | B | 160 mm | — | — | — | — | |
| | Al sheet | Q | 30 μm | — | — | — | — | |
| | Joining assistance member | N | — | — | 0.56 | 1.4 | none | |
| | Al sheet | Q | 30 μm | — | — | — | — | |
| | Al skin member | E | 20 mm | 10 | — | — | none | |
| 49 | Al skin member | F | 30 mm | 15 | — | — | none | Reverse rolling |
| | Al sheet | R | 50 μm | — | — | — | — | |
| | Joining assistance member | M | — | — | 0.56 | 1.4 | none | |
| | Al sheet | R | 50 μm | — | — | — | — | |
| | Al intermediate member | E | 10 mm | 5 | — | — | none | |
| | Al sheet | R | 50 μm | — | — | — | — | |
| | Joining assistance member | M | — | — | 0.56 | 1.4 | none | |
| | Al sheet | R | 50 μm | — | — | — | — | |
| | Al core member | D | 160 mm | — | — | — | — | |

TABLE 12

| Clad member No. | Components | Material | Thickness before rolling process | Target clad ratio (%) | Spot-like thick portions Thickness (mm) | Spot-like thick portions Distance (mm) | Etching treatment | Clad rolling process |
|---|---|---|---|---|---|---|---|---|
| 50 | Al skin member | C | 15 mm | 15 | — | — | performed | Reverse rolling |
| | Al sheet | Q | 30 μm | — | — | — | — | |
| | Joining assistance member | O | — | — | 0.56 | 1.4 | performed | |
| | Al sheet | Q | 30 μm | — | — | — | — | |
| | Al core member | I | 160 mm | — | — | — | — | |
| 51 | Al skin member | F | 20 mm | 10 | — | — | none | Reverse rolling |
| | Al core member | B | 180 mm | — | — | — | — | |
| 52 | Al skin member | F | 10 mm | 5 | — | — | none | Reverse rolling |
| | Al sheet | Q | 30 μm | — | — | — | — | |
| | Al core member | D | 190 mm | — | — | — | — | |
| 53 | Al skin member | C | 20 mm | 10 | — | — | performed | Reverse rolling |
| | Al sheet | Q | 50 μm | — | — | — | — | |
| | Al core member | C | 180 mm | — | — | — | — | |
| 54 | Al skin member | A | 20 mm | 10 | — | — | none | Reverse rolling |
| | Al sheet | T | 30 μm | — | — | — | — | |
| | Joining assistance member | O | — | — | 0.7 | 1.4 | none | |
| | Al sheet | T | 30 μm | — | — | — | — | |
| | Al core member | C | 180 mm | — | — | — | — | |
| 55 | Al skin member | A | 20 mm | 10 | — | — | none | Reverse rolling |
| | Al sheet | Q | 30 μm | — | — | — | — | |
| | Joining assistance member | M | — | — | 3.8 | 16 | performed | |
| | Al sheet | Q | 30 μm | — | — | — | — | |
| | Al core member | C | 180 mm | — | — | — | — | |

TABLE 12-continued

| Clad member No. | Components | Material | Thickness before rolling process | Target clad ratio (%) | Spot-like thick portions Thickness (mm) | Spot-like thick portions Distance (mm) | Etching treatment | Clad rolling process |
|---|---|---|---|---|---|---|---|---|
| 56 | Al skin member | C | 20 mm | 10 | — | — | performed | Reverse rolling |
|  | Al sheet | Q | 10 μm | — | — | — | — |  |
|  | Joining assistance member | O | — | — | 0.14 | 0.14 | performed |  |
|  | Al sheet | Q | 10 μm | — | — | — | — |  |
|  | Al core member | C | 180 mm | — | — | — | — |  |
| 57 | Al skin member | B | 20 mm | 10 | — | — | none | Reverse rolling |
|  | Al sheet | Q | 250 μm | — | — | — | — |  |
|  | Joining assistance member | M | — | — | 3.2 | 13 | none |  |
|  | Al sheet | Q | 250 μm | — | — | — | — |  |
|  | Al core member | E | 180 mm | — | — | — | — |  |

After the annealing, each of the various kinds of aluminum clad member obtained as described above was observed of its appearance, evaluated in terms of occurrence of peeling and blister of the skin member and surface smoothness, as in the Example 1. Results of the observation and evaluation are indicated in Tables 13 and 14 given below.

Further, each aluminum clad member was observed in its cross section, and clad ratios of the Al skin member and the Al intermediate member were measured as in the Example 1. Results of the measurement are also indicated in Tables 13 and 14.

TABLE 13

| Clad member No. | Peeling of the skin member | Blister of the skin member | Surface smoothness Appearance | Surface smoothness Evaluation | Clad ratio Distribution (%) | Clad ratio Evaluation | Comprehensive evaluation |
|---|---|---|---|---|---|---|---|
| 36 | None | None | Smooth | Good | 9.7~10.1 | Excellent | Excellent |
| 37 | None | None | Smooth | Good | 9.8~10.2 | Excellent | Excellent |
| 38 | None | None | Smooth | Good | 9.8~10.1 | Excellent | Excellent |
| 39 | None | None | Smooth | Good | 9.4~10.3 | Good | Good |
| 40 | None | None | Smooth | Good | 0.95~1.04 | Good | Good |
| 41 | None | None | Smooth | Good | 38.3~41.9 | Good | Good |
| 42 | None | None | Smooth | Good | 9.8~10.2 | Excellent | Excellent |
| 43 | None | None | Smooth | Good | 4.9~5.1 | Excellent | Excellent |
| 44 | None | None | Smooth | Good | 4.8~5.2 | Good | Good |
| 45 | None | None | Smooth | Good | 4.8~5.0 | Excellent | Excellent |
| 46 | None | None | Smooth | Good | 4.9~5.1 | Excellent | Excellent |
| 47 | None | None | Smooth | Good | 9.7~10.1 | Excellent | Excellent |
| 48 | None | None | Smooth | Good | G: 9.4~10.3 E: 9.5~10.3 | Good | Good |
| 49 | None | None | Smooth | Good | F: 14.6~15.3 E: 4.9~5.1 | Excellent | Excellent |
| 50 | None | None | Smooth | Good | 14.4~15.5 | Good | Good |

TABLE 14

| Clad member No. | Peeling of the skin member | Blister of the skin member | Surface smoothness Appearance | Surface smoothness Evaluation | Clad ratio Distribution (%) | Clad ratio Evaluation | Comprehensive evaluation |
|---|---|---|---|---|---|---|---|
| 51 | None | Partial blister took place | Smooth | Good | 8.7~10.5 | Poor | Poor |
| 52 | None | Partial blister took place | Smooth | Good | 4.5~5.2 | Poor | Poor |
| 53 | Rolling process was terminated since peeling of the skin member took place due to unjoining of the members | Could not be evaluated | Could not be evaluated | Could not be evaluated | Could not be evaluated | Could not be evaluated | Poor |
| 54 | Rolling process was terminated since peeling of the skin member took place due to unjoining of the members | Could not be evaluated | Could not be evaluated | Could not be evaluated | Could not be evaluated | Could not be evaluated | Poor |

TABLE 14-continued

| | | | Results of rolling process | | | | |
|---|---|---|---|---|---|---|---|
| Clad member No. | Peeling of the skin member | Blister of the skin member | Surface smoothness Appearance | Evaluation | Clad ratio Distribution (%) | Evaluation | Comprehensive evaluation |
| 55 | None | Partial blister took place | Entire surface area had irregularities | Poor | 9.2~10.6 | Poor | Poor |
| 56 | Peeling of the skin member took place in an end portion as seen in the rolling direction | None | Smooth | Good | 9.2~10.3 | Poor | Poor |
| 57 | Peeling of the skin member took place in opposite end portions as seen in the rolling direction | Partial blister took place | Smooth | Good | 9.4~10.5 | Poor | Poor |

As is apparent from the results in Tables 10-12 and 13-14, the aluminum clad members Nos. 36-50 produced according to the invention could be soundly produced by the clad rolling process so as to have the thickness of 1 mm, irrespective of the clad ratio, without occurrence of the peeling and the blister of the skin member. Further, the aluminum clad members Nos. 36-50 were recognized to have excellent properties in terms of the surface smoothness and the clad ratio distribution.

On the other hand, in the aluminum clad member No. 51 produced without disposing the joining assistance member according to the invention and the Al sheet between the Al skin member and the Al core member, the Al skin member and the Al core member were not sufficiently joined together, and occurrence of the blister of the skin member was recognized. Further, in production of the aluminum clad member No. 51, sliding of the Al skin member and the Al core member at their interface could not be restricted, and a large variation in the clad ratio was recognized in the aluminum clad member No. 51. In the aluminum clad member No. 52 produced by disposing only the Al sheet between the Al skin member and the Al core member, the Al skin member and the Al core member were not sufficiently joined together, and partial blister of the skin member was recognized. Like the aluminum clad member No. 51 described above, the aluminum clad member No. 52 had a large variation in the clad ratio. The aluminum clad member No. 53 was produced by using a combination of the Al skin member and the Al core member, which have a low degree of bondability with respect to each other, and by disposing only the Al sheet between the Al skin member and the Al core member. Therefore, in production of the aluminum clad member No. 53, the Al skin member and Al core member were hardly joined together, and considerable peeling of the skin member took place during the hot rolling process, resulting in failure to complete the rolling process.

In production of the aluminum clad member No. 54 using the Al sheet having a Mg content of 0.8% by mass, the Al skin member and the Al core member were hardly joined together due to stiff oxide films covering surfaces of the Al sheet, and the peeling of the skin member took place during the hot rolling process, resulting in failure to complete the rolling process. The surface of the aluminum clad member No. 55 had small irregularities generated by the use of the joining assistance member having the spot-like thick portions as thick as 3.8 mm. Further, the aluminum clad member No. 55 suffered from partial blister of the skin member due to a distance of 16 mm between the adjacent spot-like thick portions, and had a large variation in the clad ratio. In production of the aluminum clad member No. 56 using the joining assistance member having the spot-like thick portions of a thickness of 0.14 mm, oxide films covering surfaces of the Al skin member and the Al core member were not sufficiently destructed, so that the Al skin member and the Al core member were not effectively joined together, and the peeling of the skin member took place in an end portion of the clad member during the hot rolling process, and the obtained clad member No. 56 had poor clad ratio distribution.

In production of the aluminum clad member No. 57 using the Al sheet having a thickness of 250 μm, the spot-like thick portions of the joining assistance member could not sufficiently exhibit their effect to destruct oxide films in portions of contact between the spot-like thick portions and the Al skin and core members, resulting in the peeling of the skin member in the opposite end portions of the clad member No. 57 as seen in the rolling direction. Further, it was recognized that the clad member No. 57 had poor clad ratio distribution and suffered from partial blister of the skin member in its central portion as seen in the rolling direction, in which portion the Al skin member and the Al core member were joined together.

As is apparent from the results described above, the present invention can advantageously improve productivity and quality of the intended aluminum clad members, to considerably reduce a cost of their production. Also, the present invention permits production of the aluminum clad members which are difficult to be produced by the conventional method, making it possible to design the clad members having high degrees of strength, formability and corrosion resistance.

The invention claimed is:

1. A method of producing an aluminum clad member by superposing at least one Al skin member formed of aluminum or an aluminum alloy on one or both of opposite major surfaces of an Al core member formed of aluminum or an aluminum alloy, to form a stack, and subjecting the stack to a hot rolling process, to join together said Al core member and said at least one Al skin member and integrate those members into a one-piece body, wherein:

said stack comprises a joining assistance member disposed at a joint interface between said Al core member and said at least one Al skin member, said joining assistance member being formed by crossing Al wires of aluminum or an aluminum alloy with each other in longitudinal and lateral directions to form a grid, and having a structure in which thick portions having a thickness of 0.2-3.2 mm are formed at intersections of said Al wires and arranged in the longitudinal and lateral directions so as to be spaced apart from each other by a distance of 0.2-13 mm;

said hot rolling process is performed with respect to said stack in a state wherein prior to said hot rolling process said Al core member, said joining assistance member and said at least one Al skin member are partially fixed together at a portion of a perimeter of said stack, or those members are not fixed together, and said joint interface that is to be subjected to said hot rolling process is communicated with an ambient air.

2. The method of producing the aluminum clad member according to claim 1, wherein said stack further comprises at least one Al sheet disposed on one or both of opposite sides of said joining assistance member, said at least one Al sheet having a thickness of 5-200 μm and being formed of an aluminum material having a Mg content of 0-0.7% by mass, and said hot rolling process is performed with respect to said stack in which said joining assistance member and said at least one Al sheet are disposed at said joint interface between said Al core member and said at least one Al skin member.

3. The method of producing the aluminum clad member according to claim 1, wherein said Al wires have a diameter of 0.1-1.6 mm.

4. The method of producing the aluminum clad member according to claim 1, wherein said Al wires are formed of an Al—Mg-based alloy containing 1.5-6% by mass of magnesium.

5. The method of producing the aluminum clad member according to claim 1, wherein oxide films covering surfaces of said Al wires are chemically destructed and removed by a treatment performed with respect to said Al wires by using an acid solution or an alkaline solution.

6. The method of producing the aluminum clad member according to claim 1, wherein said hot rolling process is performed by conducting a reverse rolling operation in which said stack is passed between a pair of rolls a plurality of times, and a direction of rotation of the rolls in odd-number passes and a direction of rotation of the rolls in even-number passes are opposite to each other, so that said hot rolling process is performed alternately in opposite two directions.

7. The method of producing the aluminum clad member according to claim 1, wherein said stack is inserted between a pair of rolls without applying a load to said stack, and then a load is applied to said stack and the pair of rolls are rotated to perform said hot rolling process by conducting a reverse rolling operation in which a direction of rotation of the rolls is reversed each time said stack is passed between the rolls.

8. The method of producing the aluminum clad member according to claim 1, wherein said stack further comprises an Al intermediate member in the form of a plate of aluminum or an aluminum alloy disposed between said Al core member and said at least one Al skin member, said joining assistance member is disposed at at least one of an interface between said Al core member and said Al intermediate member and an interface between said Al intermediate member and said at least one Al skin member, and prior to said hot rolling process said Al core member, said Al intermediate member, said joining assistance member and said at least one Al skin member are partially fixed together at a portion of the perimeter of said stack, or those members are not fixed together.

9. The method of producing the aluminum clad member according to claim 2, wherein said stack further comprises an Al intermediate member in the form of a plate of aluminum or an aluminum alloy disposed between said Al core member and said at least one Al skin member, and said joining assistance member and said at least one Al sheet having a thickness of 5-200 μm and formed of an aluminum material having a Mg content of 0-0.7% by mass are disposed at at least one of an interface between said Al core member and said Al intermediate member and an interface between said Al intermediate member and said at least one Al skin member, such that said at least one Al sheet is disposed on one or both of opposite sides of said joining assistance member.

10. The method of producing the aluminum clad member according to claim 2, wherein said at least one Al sheet is formed of pure aluminum or an aluminum material having an aluminum content not lower than 99.0% by mass.

* * * * *